United States Patent
Yusupov et al.

(10) Patent No.: US 11,766,609 B2
(45) Date of Patent: *Sep. 26, 2023

(54) SYSTEM AND INTERFACES FOR PROVIDING AN INTERACTIVE SYSTEM

(71) Applicant: HQ Trivia LLC, New York, NY (US)

(72) Inventors: Ruslan Yusupov, New York, NY (US); Colin Andrew Kroll, New York City, NY (US); Alexander Martin DeJarnatt, Newport, RI (US); Patrick Cupka, New York, NY (US)

(73) Assignee: HQ Trivia LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,245

(22) Filed: Apr. 1, 2019

(65) Prior Publication Data
US 2019/0247748 A1     Aug. 15, 2019

Related U.S. Application Data

(63) Continuation-in-part of application No. 15/900,488, filed on Feb. 20, 2018.
(Continued)

(51) Int. Cl.
*H04N 21/478*     (2011.01)
*A63F 13/335*     (2014.01)

(52) U.S. Cl.
CPC ....... *A63F 13/335* (2014.09); *H04N 21/4781* (2013.01); *A63F 2300/308* (2013.01); *A63F 2300/5533* (2013.01)

(58) Field of Classification Search
None
See application file for complete search history.

(56) References Cited

U.S. PATENT DOCUMENTS

| | | |
|---|---|---|
| 1,286,380 A | 12/1918 | Matthews |
| D231,712 S | 5/1974 | Snitzel |
| (Continued) | | |

FOREIGN PATENT DOCUMENTS

| | | |
|---|---|---|
| EM | 001694225-0014 | 4/2010 |
| EM | 001928045-0001 | 6/2011 |
| (Continued) | | |

OTHER PUBLICATIONS

[No Author Listed], DressagePro /HQ-Logo, posted on Mar. 31, 2017, © 2019 Freebie Supply [online], [site visited Mar. 11, 2019]. Available from Internet, < URL: https://dressagepro.com/hq-logo/>.
(Continued)

*Primary Examiner* — Jason K Lin
(74) *Attorney, Agent, or Firm* — Wolf, Greenfield & Sacks, P.C.

(57) ABSTRACT

According to other aspects, a real-time system may be provided that is capable of scaling to hundreds of thousands of real-time clients (or more) to conduct a single-program instance in an interactive manner that combines video elements with interactive program elements. To provide such capabilities, a system and client software is provided that allows real-time distribution of video, and scripted rendering of interactive elements in relation to the video. Such systems may include, for example, cluster-based systems that are capable of scaling horizontally based on the number of clients involved in a particular program instance.

18 Claims, 19 Drawing Sheets

Related U.S. Application Data

(60) Provisional application No. 62/652,290, filed on Apr. 3, 2018, provisional application No. 62/630,161, filed on Feb. 13, 2018, provisional application No. 62/630,154, filed on Feb. 13, 2018.

(56) References Cited

U.S. PATENT DOCUMENTS

| | | |
|---|---|---|
| 3,869,813 A | 3/1975 | Hancy |
| D284,479 S | 7/1986 | de Bascher |
| D411,321 S | 6/1999 | Norman |
| D426,206 S | 6/2000 | Richter |
| 6,267,379 B1 | 7/2001 | Forrest et al. |
| D471,239 S | 3/2003 | Schaller |
| D543,992 S | 6/2007 | Vigesaa |
| D562,845 S | 2/2008 | Armstrong et al. |
| D565,583 S | 4/2008 | Gunn et al. |
| D570,863 S | 6/2008 | Chen |
| D572,721 S | 7/2008 | Guimaraes et al. |
| D578,544 S | 10/2008 | Nathan et al. |
| D588,606 S | 3/2009 | Nathan et al. |
| D590,838 S | 4/2009 | Bisig et al. |
| 7,543,322 B1 * | 6/2009 | Bhogal ............ H04N 21/435 725/46 |
| D595,731 S | 7/2009 | Vu et al. |
| 7,565,681 B2 | 7/2009 | Ngo et al. |
| D624,929 S | 10/2010 | Agnetta et al. |
| D644,663 S | 9/2011 | Gardner et al. |
| D654,927 S | 2/2012 | Jones et al. |
| 8,121,901 B2 | 2/2012 | Blanchard, Jr. et al. |
| D664,596 S | 7/2012 | Luberto |
| D667,421 S | 9/2012 | Kriese et al. |
| D674,021 S | 1/2013 | Luberto |
| D681,046 S | 4/2013 | Davis |
| D684,180 S | 6/2013 | Cimtani et al. |
| D689,887 S | 9/2013 | Meng et al. |
| D698,802 S | 2/2014 | Davis |
| D707,245 S | 6/2014 | Bruck et al. |
| D719,974 S | 12/2014 | Knutson et al. |
| D722,077 S | 2/2015 | Zhang et al. |
| D726,214 S | 4/2015 | Wantland et al. |
| D727,955 S | 4/2015 | Ray et al. |
| D727,958 S | 4/2015 | Ray et al. |
| D731,538 S | 6/2015 | Lee |
| D734,345 S | 7/2015 | Kadosh |
| D741,354 S | 10/2015 | Lee et al. |
| D741,903 S | 10/2015 | Verma et al. |
| 9,161,066 B1 | 10/2015 | Oztaskent et al. |
| D744,527 S | 12/2015 | Sanderson |
| D745,551 S | 12/2015 | Kapur et al. |
| D748,143 S | 1/2016 | Kwon et al. |
| D749,625 S | 2/2016 | Yang et al. |
| D750,125 S | 2/2016 | Yang et al. |
| D753,167 S | 4/2016 | Yu et al. |
| D757,070 S | 5/2016 | Dziuba |
| D757,072 S | 5/2016 | Seo et al. |
| D757,102 S | 5/2016 | Woodland |
| D757,105 S | 5/2016 | Park |
| D758,420 S | 6/2016 | Zhou |
| D759,112 S | 6/2016 | Riske et al. |
| D759,704 S | 6/2016 | Kettner et al. |
| D760,261 S | 6/2016 | Yu et al. |
| D763,898 S | 8/2016 | Raykovich et al. |
| D763,915 S | 8/2016 | Puzio |
| D764,495 S | 8/2016 | Cartlidge |
| D764,528 S | 8/2016 | Choi et al. |
| D765,105 S | 8/2016 | Virk et al. |
| D765,111 S | 8/2016 | Cole |
| 9,424,235 B2 | 8/2016 | Chamberlain et al. |
| D766,972 S | 9/2016 | Millares et al. |
| D769,898 S | 10/2016 | Lee et al. |
| D770,485 S | 11/2016 | Olsson et al. |
| D770,527 S | 11/2016 | Jitkoff et al. |
| D774,068 S | 12/2016 | Derby et al. |
| 9,511,291 B2 | 12/2016 | Lyons et al. |
| D777,747 S | 1/2017 | Derby et al. |
| D777,782 S | 1/2017 | Appel et al. |
| D781,887 S | 3/2017 | Dziuba et al. |
| D782,526 S | 3/2017 | Rind et al. |
| D782,527 S | 3/2017 | Rind et al. |
| D783,032 S | 4/2017 | Cashner et al. |
| D783,655 S | 4/2017 | Hu |
| D783,657 S | 4/2017 | Pitman et al. |
| D784,397 S | 4/2017 | Kim et al. |
| D784,443 S | 4/2017 | Gondor |
| 9,615,065 B2 | 4/2017 | Frenette et al. |
| 9,632,013 B2 | 4/2017 | Rivas et al. |
| D787,550 S | 5/2017 | Ollila et al. |
| D789,394 S | 6/2017 | Mandawat et al. |
| D789,977 S | 6/2017 | Mijatovic et al. |
| D789,978 S | 6/2017 | Mijatovic et al. |
| D791,180 S | 7/2017 | Sun |
| D793,428 S | 8/2017 | Omata |
| D795,921 S | 8/2017 | Bhatti et al. |
| D796,522 S | 9/2017 | L'Heureux et al. |
| D796,542 S | 9/2017 | Bhatti et al. |
| D797,142 S | 9/2017 | Prabhu |
| D799,512 S | 10/2017 | Johnston |
| D802,617 S | 11/2017 | Pitman et al. |
| D802,667 S | 11/2017 | Chan |
| D805,097 S | 12/2017 | Chaudhri et al. |
| D806,107 S | 12/2017 | Kim et al. |
| D809,548 S | 2/2018 | Anzures et al. |
| D813,270 S | 3/2018 | Stephens et al. |
| D814,513 S | 4/2018 | Bendert et al. |
| D815,663 S | 4/2018 | Dudey et al. |
| D821,423 S | 6/2018 | Von Reden et al. |
| D822,055 S | 7/2018 | Canna |
| D825,608 S | 8/2018 | Andrizzi et al. |
| D830,401 S | 10/2018 | Mancuso et al. |
| D848,471 S | 5/2019 | Clymer et al. |
| D849,777 S | 5/2019 | Von Reden |
| D850,462 S | 6/2019 | Hazel et al. |
| D851,669 S | 6/2019 | Baldi et al. |
| D852,213 S | 6/2019 | Clediere et al. |
| D852,844 S | 7/2019 | Jitkoff et al. |
| D854,041 S | 7/2019 | Alexander |
| D854,046 S | 7/2019 | Reyes |
| D854,047 S | 7/2019 | Stephens et al. |
| D855,073 S | 7/2019 | Camper |
| D860,226 S | 9/2019 | Fung et al. |
| D860,255 S | 9/2019 | Bayat et al. |
| D861,703 S | 10/2019 | Suslik |
| D865,808 S | 11/2019 | Yusupov et al. |
| D870,148 S | 12/2019 | Chuang et al. |
| D872,124 S | 1/2020 | Chu |
| D874,517 S | 2/2020 | Ollila et al. |
| D888,070 S | 6/2020 | Yusupov et al. |
| D890,207 S | 7/2020 | Kentley-Klay et al. |
| D890,777 S | 7/2020 | Guzman |
| D899,457 S | 10/2020 | Straub et al. |
| D905,106 S | 12/2020 | Kang |
| D910,071 S | 2/2021 | Chen |
| 2002/0012322 A1 | 1/2002 | Rooney |
| 2002/0065922 A1 * | 5/2002 | Shastri ............ H04L 65/4084 709/227 |
| 2002/0147987 A1 * | 10/2002 | Reynolds ............ H04N 7/165 348/E7.071 |
| 2003/0228909 A1 | 12/2003 | Tanaka et al. |
| 2005/0119913 A1 * | 6/2005 | Hornreich ............ G06F 16/972 705/2 |
| 2005/0197189 A1 | 9/2005 | Schultz |
| 2006/0088683 A1 | 4/2006 | Wilson |
| 2008/0054571 A1 | 3/2008 | Davidzon et al. |
| 2008/0086742 A1 * | 4/2008 | Aldrey ............ H04N 21/4667 725/24 |
| 2008/0131852 A1 | 6/2008 | Van Hofwegen |
| 2008/0282286 A1 * | 11/2008 | Or ............ H04H 60/33 725/34 |
| 2008/0317979 A1 | 12/2008 | Itakura et al. |
| 2009/0013086 A1 | 1/2009 | Greenbaum |
| 2009/0150502 A1 * | 6/2009 | Pallamreddy ............ H04L 67/26 709/206 |
| 2009/0228807 A1 | 9/2009 | Lemay |

(56) References Cited

U.S. PATENT DOCUMENTS

| | | | |
|---|---|---|---|
| 2009/0325706 A1* | 12/2009 | Geist, Jr. | A63F 13/12 |
| | | | 463/40 |
| 2010/0125791 A1 | 5/2010 | Katis et al. | |
| 2010/0318291 A1 | 12/2010 | Gluck | |
| 2011/0314710 A1 | 12/2011 | Luberto | |
| 2012/0246578 A1 | 9/2012 | Baldwin et al. | |
| 2012/0315993 A1 | 12/2012 | Dumont et al. | |
| 2013/0116044 A1 | 5/2013 | Schwartz | |
| 2014/0337791 A1 | 11/2014 | Agnetta et al. | |
| 2015/0066980 A1 | 3/2015 | Kim | |
| 2015/0086174 A1 | 3/2015 | Abecassis | |
| 2015/0089372 A1 | 3/2015 | Mandalia et al. | |
| 2015/0149902 A1 | 5/2015 | Zavesky et al. | |
| 2015/0193407 A1 | 7/2015 | Baluja | |
| 2016/0210270 A1 | 7/2016 | Kelly et al. | |
| 2016/0255140 A1 | 9/2016 | Shattil | |
| 2016/0299670 A1 | 10/2016 | Breedvelt-Schouten et al. | |
| 2017/0006322 A1* | 1/2017 | Dury | H04N 21/254 |
| 2017/0064033 A1* | 3/2017 | Stackel | H04L 67/306 |
| 2017/0182423 A1 | 6/2017 | Leppinen et al. | |
| 2017/0237785 A1 | 8/2017 | Peng et al. | |
| 2019/0253761 A1 | 8/2019 | Yusupov et al. | |

FOREIGN PATENT DOCUMENTS

| | | |
|---|---|---|
| KR | 300837237 | 1/2016 |
| WO | WO D078497-039 | 6/2012 |
| WO | WO D083159-020 | 8/2014 |
| WO | WO D098444-004 | 12/2017 |

OTHER PUBLICATIONS

[No Author Listed], Freebie Supply /Logos / HQ Logo, posted on Apr. 23, 2018, © 2019 Freebie Supply [online], [site visited Mar. 11, 2019]. Available from Internet, <URL: https://freebiesupply.com/logos/hq-logo/>.

[No Author Listed], Google Play/ Store/ Apps / Intermedia Labs, posted on Dec. 24, 2017, © 2019 Google [online], [site visited Mar. 11, 2019]. Available from Internet, <URL:https://play.google.com/store/apps/dev?id=8025251125525325507/>.

[No Author Listed], LabVIEW Graphical User Interface for LIRC. Digilent Blog. Feb. 2, 2017. Retrieved on Apr. 24, 2018: https://blog.digilentinc.com/labview-graphical-user-interface-for-lirc/.

[No Author Listed], LED GUI. www.gamedevmarket.net. Retrieved on Apr. 24, 2018: https://www.gamedevmarket.net/asset-led-gui-10301/.

[No Author Listed], Screen Captures Taken From Full Game the Q (Saturday Nov. 30, 2017 5pm EST). The Q. Full video available at https://www.youtube.com/watch?v=zbRPntvQW40.

[No Author Listed], Screen Captures Taken from HQ Trivia—Thursday, Oct. 19, 2017 12pm PDT—Full Game.: Intermedia Labs, Inc. Full video available at https://www.youtube.com/watch?v=in-PX sOQdE.

[No Author Listed], Vector-Vector graphical user interface UI GUI for 2d video games. Wooden menu, panels and buttons for menu. 123RF. Retrieved on Apr. 24, 2018: http://www.123rf.com/photo_59034814_stock-vector-vector-graphical-user-interface-ui-wi-for-2d-video-games-wooden-menu-panels-and-buttons-for-menu-.html.

Aung et al., Augmented reality-based RehaBio system for shoulder rehabilitation. International Journal of Mechatronics and Automation. Jan. 2014;4(1):52-62. Retrieved on Apr. 24, 2018: https://www.researchgate.net/publication/264812966_Augmented_reality-based_RehaBio_system_for_shoulder_rehabilitation.

E-Learning App III, by Margoi, dribbble.com [online], published on Nov. 5, 2015, [retrieved on Jul. 30, 2018], retrieved from the Internet <URL: https://dribbble.com/shots/2336558-E-learning-app-ll I> (Year: 2015).

Full Game the Q (Sunday Nov. 26, 2017), by the Q—Live Trivia, YouTube [online], published on Nov. 26, 2017 , [retrieved on Jul. 27, 2018], retrieved from the Internet <URL: https://www.youtube.com/watch?v=lfJsTnBn2NY> (Year: 2017).

Game Mobile UI Design in Android Studio Tutorial, by Angga Risky, YouTube [online], published on Oct. 15, 2017, [retrieved on Jul. 27, 2018],retrieved from the Internet <URL: https://www.youtube.com/watch?v=D5M29vOJU2M> (Year: 2017).

Genius—Live Quiz Game Show, by Genius Quiz, YouTube [online], published on Feb. 12, 2018, [retrieved on Jul. 27, 2018], retrieved from the Internet <URL: https://www.youtube.com/watch?v=Ot5iaxSxejg> (Year: 2018).

HQ Trivia—Thursday, Oct. 19, 2017, by Mendelson3, YouTube [online], published on Oct. 19, 2017, [retrieved on Jul. 27, 2018], retrieved from the Internet <URL: https://www.youtube.com/watch?v=in-Px sOQdE> (Year: 2017).

JusPlay Live Trivia Show I Feb. 28, by Jus Play, YouTube [online], published on Mar. 1, 2018, [retrieved on Jul. 27, 2018], retrieved from the Internet <URL: https://www.youtube.com/watch?v=JBW6FT-IXFO> (Year: 2018).

Quiz Wars, by Nazuir, dribbble.com [online], published on Feb. 2, 2017, [retrieved on Jul. 30, 2018], retrieved from the Internet <URL: https://dribbble.com/shots/3260132-Quiz -Wars> (Year: 2017).

Quiz, by Goetz, dribbble.com [online], published on Apr. 22, 2016, [retrieved on Jul. 30, 2018], retrieved from the Internet <URL: https:// dribbble.com/shots/2668235-Quiz> (Year: 2016).

[No Author Listed], Braid Weave, Diagonal Lines Seamless Textures,. by blankstock, canstockphoto.com [online], published on May 2, 2016, [retrieved on May 13, 2019], retrieved from the Internet [URL: https://www.canstockphoto.com/braid-weave-diagonal-lines-seamless-36608877._html] (Year: 2016).

Aashna, Live Trivia & Quiz Game Show, published on Feb. 19, 2018, [retrieved on May 13, 2019], retrieved from the Internet [URL: https://dribbble.com/shots/4241969-Live-Trivia-Quiz-game-Show] (Year: 2018).

Banys, Trivia App—QuizMix. published on Jan. 31, 2018, [retrieved on May 13, 2019], retrieved from the Internet [URL: https://dribbble.com/shots/4167 449-Trivia-app-QuizMix] (Year: 2018).

[No Author Listed], GQ Logo PNG Transparent & SVG Vector. Freebie Supply. Posted on Apr. 23, 2018. site visited Oct. 23, 2020. Available from the Internet: https://freebiesupply.com/logos/gq-logo/>. 10 pages.

[No Author Listed], Numbers 3D Countdown in Green Screen free Stock Footage, by Hdgreenstudio, YouTUbe [online], published on Mar. 26, 2014. https://www.youtube.com/watch?v=gZWcjOwfQGE.

[No Author Listed], Timer Countdown 2014 Animation with Lots of Effects, by AA VFX, YouTube [online], published on Dec. 18, 2012. https://www.youtube.co/watch?v=HGndg8ivZsQ.

Anderson, HQ Live Trivia Game Show App Review. Common Sense Media. Posted on Nov. 27, 2017 . Site visited Oct. 23, 2020. Available from the Internet: https://tinyurl.com/y3p2a85j/. 6 pages.

Kuwayama, Trademarks & Symbols. vol. 1: Alphabetical Designs. Kashiwa Shobo Publishers, Ltd. Tokyo. 1973: p. 34.

[No Author Listed], Unrecel Quickdry. Unrecelquickdry.com [online]. Available by Sep. 13, 2013 as verified by Wayback Machine. Retrieved on Apr. 2, 2021 from <URL: https://www.unrecelquickdry.com/> (Year: 2013).

Twitter post entitled "HIQ Tyres & Autocare Maidstone" 1 page. Posted Apr. 9, 2016 by user MaidstoneHiq. Retrieved from Internet: <https:https://twitter.com/MaidstoneHiq/status/718881032385273856/photo/1> (Year:2016).

Twitter post entitled "Top of the Morning to You!" 1 page. Posted Mar. 17, 2016 by user "HIQEasyTyre". Retrieved from Internet: <https://twitter.com/HiQEasyTyre/sttus/710442989248716800/photo/1> (Year:2016).

U.S. Appl. No. 15/900,488, filed Feb. 20, 2018, Yusupov et al.
U.S. Appl. No. 29/640,096, filed Mar. 12, 2018, Yusupov et al.
U.S. Appl. No. 29/641,216, filed Mar. 20, 2018, Yusupov et al.
U.S. Appl. No. 29/647,505, filed May 14, 2018, Yusupov et al.

\* cited by examiner

SYSTEM AND INTERFACES FOR PROVIDING AN INTERACTIVE SYSTEM

RELATED APPLICATIONS

This application is a Non-Provisional of Provisional (35 U.S.C. § 119(e)) of U.S. Provisional Patent Application Ser. No. 62/652,290, filed Apr. 3, 2018, entitled "SYSTEM AND INTERFACES FOR PROVIDING AN INTERACTIVE SYSTEM." This Application is a Continuation-in-Part of U.S. patent application Ser. No. 15/900,488, filed Feb. 20, 2018, entitled "SYSTEM AND INTERFACES FOR PROVIDING AN INTERACTIVE SYSTEM," which is a Non-Provisional of Provisional (35 U.S.C. § 119(e)) of U.S. Provisional Patent Application Ser. No. 62/630,154, filed Feb. 13, 2018, entitled "SYSTEM AND INTERFACES FOR PROVIDING AN INTERACTIVE SYSTEM," and U.S. Provisional Patent Application Ser. No. 62/630,161, filed Feb. 13, 2018, entitled "SYSTEM AND INTERFACES FOR PROVIDING AN INTERACTIVE SYSTEM," the entire disclosure of each of which is incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

There exists many types of interactive games and game formats, along with specialized systems to conduct those games between players. With the popularity of mobile devices, the use of interactive mobile games have risen dramatically. Generally, such games are limited to a fixed number of players, such as by the player selecting a number of friends or a game system matching a fixed number players to each other.

SUMMARY

New types of games, game formats and related technology are needed to increase player interest and to provide compelling content. It is appreciated that in multiplayer environments, performance is an issue and most games suffer from scalability issues which degrade performance. It is appreciated that many game formats are limited to the number of players that can simultaneously play such games. It would be advantageous to provide a game format that scaled to thousands, and even hundreds of thousands of participants that can play against each other in a single game instance in real time. In one such game format, interactive game elements are provided to a mobile device and are activated for a certain period of time. Participants provide responses to the these elements, and aggregated feedback is provided to the entire population of game players in real time.

In one such game format, a live format interface is provided within the interface of a mobile device, and interactive game elements are provided in parallel to the multiple mobile devices and displayed on the mobile device displays (either alone or in combination with the live format window). The game itself may include interactive questions or other types of games where individual players provide responses within a prescribed time period. According to one aspect, the nature of the prescribed time period is such that a player will not be permitted to research an answer to the question from outside sources. The prescribed time period may be tracked at a central location, and responses from clients received within the prescribed time period may be evaluated. Responses received outside of the time period may cause the player to be eliminated. Further, incorrect responses may be eliminated, and information indicating the people who proceed to the next round (e.g., in an aggregated format derived from all of the mobile devices participating in the game) may be displayed to all of the participating users. Eliminated users may be permitted to continue observing the game until the game concludes.

The questions may be provided serially to the population of players in successive rounds until a final round where one or more winners are determined. Winners may be provided a prize (e.g., money) that may be split among the one or more winners. Games may be provided at preset times and/or limited number of times, increasing the number of aggregated players. In an optional game format, players are permitted additional guesses within the game responsive to referrals of the game to other potential players. For instance, responsive to selecting a control to invite another player, and that player joining responsive to that invitation, the player that provided the invite may be permitted to survive one or more rounds.

In one particular game format, the game may be presented in a game show format, including an announcer. In this format, a live video feed is transmitted in parallel in real time to the multiple mobile devices. Interactive game elements are transmitted also in real time to the multiple mobile devices. Such interactive game elements may be displayed along with the live video feed within the interface of each of the mobile devices. Sets of interactive game elements may be displayed in predefined sequences during a live broadcast of the interactive program (e.g., a game show or other type of game). As discussed above, multiple choice questions may be presented within a number of rounds, and players may be successively eliminated. Other types of game formats may be provided. In general, an architecture is provided for conducting a massive multilevel elimination game.

According to other aspects, a real-time system may be provided that is capable of scaling to hundreds of thousands of real-time clients (or more) to conduct a single-game instance in an interactive manner that combines video elements with interactive game elements. To provide such capabilities, a system and client software is provided that allows real-time distribution of video, and scripted rendering of interactive elements in relation to the video. Such systems may include, for example, cluster-based systems that are capable of scaling horizontally based on the number of clients involved in a particular game instance.

In a specific implementation of a client user interface, a component is provided that collects and aggregates multiple responses received from the multitude of client devices and provides results that are displayed to each of the client devices in real time. For instance, there may be real-time counter elements that are displayed to the user that record the number of responses, and the results are determined through the aggregated responses.

In another implementation of a client user interface, groups of users are permitted to review responses provided by other client devices in real time. For instance, one particular user may identify that another user is allowed to see his/her response in real time. The other user, may, according to another implementation, may similarly permit the first user to access their real time responses. As real-time responses are collected, the user while playing the interactive game is permitted to see the logged responses of other users in their permissions list. According to one embodiment, both users must selectively control the access to the other user for both users to view the responses. If the users permit each of the other users in the group to review the responses in real time, a server may use a publish and subscribe model to update other members devices within the group as the users make their selections in real time.

According to some aspects, an interface of a mobile device is provided comprising a first display area adapted to display real-time video associated with a single instance of an interactive program, a second display area adapted to display an interactive element associated with the single instance of the interactive program, wherein the interactive element, when selected within a predetermined time limit, causes the mobile device to transmit a response of a user to an engine executing the single instance of the interactive program, and a third display area including at least one indicator that displays, in real time, responses of one or more other users participating in the single instance of the interactive program, wherein the one or more other users have permitted the display of their responses to the user within the interface.

According to some embodiments, the interface further comprises a fourth display area including at least one indicator that displays, in real time, aggregated responses of multiple users participating in the single instance of the interactive program, the aggregated responses including the transmitted response.

According to some embodiments, the first and second display areas are displayed concurrently within a single interface.

According to some embodiments, the second display area is adapted to display a plurality of interactive elements in multiple rounds of the interactive program, the plurality of rounds being associated with the single instance of the interactive program.

According to some embodiments, the interface further comprises a fourth display area including an indicator that identifies a counter of multiple users participating in the single instance of the interactive program.

According to some embodiments, the third display area including the at least one indicator that displays, in real time, responses of the one or more other users participating in the single instance of the interactive program, displays icons within an interactive program element.

According to some embodiments, the interface further comprises a fourth display area including at least one indicator that displays, in real time, a graphical representation of the aggregated responses of the multiple users participating in the single instance of the interactive program.

According to some embodiments, the real-time video associated with the single instance of the interactive program includes live video captured and streamed in real time. According to some embodiments, the live video includes a presentation of a live program including a program host.

According to some embodiments, the second display area is adapted to display a counter that indicates, to the user, a remaining time permitted for the user to activate the interactive element associated with the single instance of the interactive program.

According to some embodiments, the third display area including the at least one indicator that displays, in real time, responses of the one or more other users participating in the single instance of the interactive program, displays icons of other users within an interactive program element that selected the interactive program element prior to the expiration of the remaining time.

According to another aspect, a multi-round elimination trivia game is provided that permits a cash prize to be distributed to users within the game application upon conclusion of the game. This cash prize may be split among users, and the proceeds may be automatically transferred to an account of the user's choosing. The account may be, for example, a PayPal account or other type of immediate payment transfer system.

According to another aspect, an architecture is provided that provides a real-time video stream along with asynchronous messages that control the game application. In one implementation, mobile devices operated by users subscribe to a game instance, and thereafter listen for messages that include trigger events that deliver updated content. Such content may include, for example, new interactive elements, controls that provide certain functionality within the interactive game, game results, among other elements. Such elements are transmitted in parallel with video stream data that is displayed concurrently within the interfaces of the mobile devices.

According to some aspects, a game interface of a mobile device is provided comprising a first display area adapted to display real-time video associated with a single game instance of an interactive game, a second display area adapted to display an interactive element associated with the single game instance, the interactive element, when selected within a predetermined time limit, causes the mobile device to transmit a response to a game engine executing the single game instance of the interactive game, and a display area including at least one indicator that shows, in real time, aggregated responses of multiple game players participating in the single game instance of the interactive game, the aggregated responses including the transmitted response.

According to some embodiments, the first and second display areas are displayed concurrently within a single game interface. According to some embodiments, the second display area is adapted to display a plurality of interactive elements in multiple rounds, the plurality of rounds being associated with the single game instance. According to some embodiments, the game interface further comprises a display area including an indicator that identifies a counter of multiple game players participating in the single game instance of the interactive game.

According to some embodiments, the game interface further comprises a scrollable chat window, the window including a control that permits a player to post a chat to a chat log, the chat log being associated with the single game instance of the interactive game. According to some embodiments, the scrollable chat window is associated with a sequence of interfaces associated with the single game instance of the interactive game. According to some embodiments, the scrollable chat window is displayed within a layer in relation to at least one of the first and second display areas.

According to some embodiments, the game interface further comprises a display area including at least one indicator that shows, in real time, a graphical representation of the aggregated responses of the multiple game players participating in the single game instance of the interactive game. According to some embodiments, real-time video associated with a single game instance of an interactive game includes live video captured and streamed in real time. According to some embodiments, the live video includes a presentation of a live game including a game host.

According to some embodiments, if it is determined that a player using the game interface is eliminated in any of the plurality of rounds associated with the single game instance, the game interface is adapted to permit the player to observe remaining rounds associated with the single game instance. According to some embodiments, the live video is presented among at least one interface of each round of a plurality of rounds associated with the single game instance.

According to some embodiments, the game interface further comprises an interface area having an indicator that indicates a countdown of time before conducting a first round of a plurality of rounds associated with the single game instance. According to some embodiments, the game interface further comprises an interface indicating, after the plurality of rounds associated with the single game instance are complete, at least one winning player.

According to some embodiments, the second display area adapted to display a counter that indicates to a player, a remaining time permitted for the player to activate the interactive element associated with the single game instance. According to some embodiments, the interactive element associated with the single game instance is received by multiple mobile devices in real time and displayed to multiple players that play the single interactive game instance. According to some embodiments, a number of mobile devices receiving the interactive element associated with the single game instance in real time exceeds 100,000 mobile devices. According to some embodiments, the number of mobile devices receiving the interactive element associated with the single game instance in real time exceeds 1,000,000 mobile devices. According to some embodiments, the chat log is published to a subscriber user of the chat log using a pubsub-type service.

According to some embodiments, the display area including the at least one indicator that shows, in real time, the graphical representation of the aggregated responses of the multiple game players is displayed sequentially after an expiration of the predetermined time limit. According to some embodiments, the mobile device associated with the single game instance is adapted to receive a plurality of issued events from a multiplayer game server, the events causing interactive content to be displayed in real time within the game interface, wherein the interactive content comprises a plurality of game tasks arranged in successive levels within the single game instance, and wherein the multiplayer game server is configured to eliminate a trigger of interactive content associated with the single game instance on the mobile device client responsive to a determination that a player associated with the mobile device is eliminated from the single game instance. According to some embodiments, the interactive content component permits the eliminated player to observe a remaining portion of the single game instance.

According to some embodiments, the mobile device is adapted to receive a video stream comprising live video from a video cluster component, wherein the game interface is adapted to display the video stream within the first display area, and wherein the video cluster component comprises a plurality of edge server components that replicates the video stream to a plurality of connected mobile devices including the mobile device. According to some embodiments, wherein the mobile device is adapted to selectively connect to at least one of the plurality of edge server components to receive the video stream comprising the live video. According to some embodiments, the at least one of the plurality of mobile device clients is adapted to select the at least one of the plurality of edge server components responsive to a network test operation. According to some embodiments, the mobile device is adapted to switch, in real-time, connection between the plurality of edge server components responsive to the network test operation.

According to some embodiments, the multiplayer game server eliminates the player upon a determination that the player did not select a response within the predetermined time limit within the game interface. According to some embodiments, the multiplayer game server eliminates the player upon a determination that the player did not select a correct response to the interactive content within the game interface. According to some embodiments, the mobile device is permitted to receive content associated with a remaining portion of the single game instance and display the received content within the game interface, wherein the eliminated player is prohibited from selecting any of the interactive content associated with the remaining portion of the single game instance. According to some embodiments, the mobile device is configured to receive, from the multiplayer game server adapted to conduct the single game instance, a push notification from the multiplayer game server indicating that a new game instance is being conducted, the push notification being sent responsive to a determination that the mobile device had previously participated in a previous game instance.

According to various aspects, a multiplayer game server is provided that is capable of distributing live video and interactive data to mobile clients for a singular game instance. In some aspects, a system is provided comprising a multiplayer game server adapted to conduct a single game instance associated with a plurality of mobile device clients, each one of the plurality of mobile device clients being operated by a respective player and each having a respective interactive game interface, a streaming component adapted to stream real-time video information to a plurality of mobile device clients to be displayed within the respective game interface of each of the plurality of mobile device clients, and an interactive content component adapted to issue events to the plurality of mobile device clients associated with the single game instance, the events causing interactive content to be displayed in real time in each of the respective interactive game interfaces.

According to some embodiments, the system further comprises video capture elements that capture live video in real time to create the streamed real-time video information which is broadcast in real time and displayed within the respective interactive game interfaces. According to some embodiments, each of the mobile device clients includes a web socket interface, through which each of the mobile device clients receive events transmitted by the interactive content component. According to some embodiments, the real-time video information is streamed to the plurality of mobile device clients concurrently with display of interactive content provided by the interactive content component.

According to some embodiments, the system comprises one or more cluster components adapted to scale resources to the single game instance responsive to a number of the plurality of mobile device clients. According to some embodiments, the multiplayer game server further comprises a timer component, the timer component determining whether each of the plurality of mobile device clients provides a response within a predetermined amount of time.

According to some embodiments, an interactive content component is adapted to control display of a plurality of interfaces on each of the interactive game interfaces of each respective ones of the plurality of mobile device clients. According to some embodiments, the interactive content component is adapted to issue an event that causes display of a game task on the interactive game interfaces of each respective ones of the plurality of mobile device clients.

According to some embodiments, the game task includes a multiple choice question, and the interactive content component is adapted to issue an event that causes display of a plurality of interactive elements each associated with an answer to the multiple choice question. According to some embodiments, the display of a plurality of interactive elements each associated with an answer to the multiple choice question is performed concurrently with display of the real-time video information within the same interface. According to some embodiments, at least one of mobile device client includes at least one of a cell phone, a table and a mobile computing device.

According to some embodiments, the live video captured and streamed in real time includes a presentation of a live game including a game host. According to some embodiments, the system further comprises a sequencing component that determines when interactive content is displayed in real time in each of the respective interactive game interfaces. According to some embodiments, the sequencing component is adapted to display a script to be displayed to a live game host.

According to some aspects, a method is provided, the method comprising conducting or executing in a memory, by a multiplayer game server, a single game instance associated with a plurality of mobile device clients, each one of the plurality of mobile device clients being operated by a respective player and each having a respective interactive game interface, streaming, by a streaming component, real-time video information to a plurality of mobile device clients to be displayed within the respective game interface of each of the plurality of mobile device clients, and issuing, by an interactive content component, events to the plurality of mobile device clients associated with the single game instance, the events causing interactive content to be displayed in real time in each of the respective interactive game interfaces.

According to some embodiments, the method further comprises capturing, by video capture elements, live video in real time, creating the streamed real-time video information, broadcasting the streamed video information in real time and displaying the streamed video information within the respective interactive game interfaces. According to some embodiments, the method further comprises receiving, through a web socket interface of the mobile device clients, events transmitted by the interactive content component.

According to some embodiments, the real-time video information is streamed to the plurality of mobile device clients concurrently with display of interactive content provided by the interactive content component. According to some embodiments, the method further comprises scaling resources, by one or more cluster components, to the single game instance responsive to a number of the plurality of mobile device clients.

According to some aspects, a non-transitory computer readable medium is provided, that when executed by a computer system, provides a system. The provided system in some aspects comprises a multiplayer game server adapted to conduct a single game instance associated with a plurality of mobile device clients, each one of the plurality of mobile device clients being operated by a respective player and each having a respective interactive game interface, a streaming component adapted to stream real-time video information to a plurality of mobile device clients to be displayed within the respective game interface of each of the plurality of mobile device clients, and an interactive content component adapted to issue events to the plurality of mobile device clients associated with the single game instance, the events causing interactive content to be displayed in real time in each of the respective interactive game interfaces.

According to some aspects, an improved user interface for a client is provided that shows interactive elements along with video. According to some aspects, a game interface of a mobile device is provided comprising a first display area adapted to display real-time video associated with a single game instance of an interactive game, a second display area adapted to display an interactive element associated with the single game instance, the interactive element, when selected within a predetermined time limit, causes the mobile device to transmit a response to a game engine executing the single game instance of the interactive game, and a display area including at least one indicator that shows, in real time, aggregated responses of multiple game players participating in the single game instance of the interactive game, the aggregated responses including the transmitted response.

According to some embodiments, the first and second display areas are displayed concurrently within a single game interface. According to some embodiments, the second display area is adapted to display a plurality of interactive elements in multiple rounds, the plurality of rounds being associated with the single game instance. According to some embodiments, the game interface further comprises a display area including an indicator that identifies a counter of multiple game players participating in the single game instance of the interactive game.

According to some embodiments, the game interface further comprises a scrollable chat window, the window including a control that permits a player to post a chat to a chat log, the chat log being associated with the single game instance of the interactive game. According to some embodiments, the scrollable chat window is associated with a sequence of interfaces associated with the single game instance of the interactive game. According to some embodiments, the scrollable chat window is displayed within a layer in relation to at least one of the first and second display areas. According to some embodiments, the game interface further comprises a display area including at least one indicator that shows, in real time, a graphical representation of the aggregated responses of the multiple game players participating in the single game instance of the interactive game.

According to some embodiments, the real-time video associated with a single game instance of an interactive game includes live video captured and streamed in real time. According to some embodiments, the live video includes a presentation of a live game including a game host.

According to some embodiments, if it is determined that a player using the game interface is eliminated in any of the plurality of rounds associated with the single game instance, the game interface is adapted to permit the player to observe remaining rounds associated with the single game instance.

According to some embodiments, the live video is presented among at least one interface of each round of a plurality of rounds associated with the single game instance. According to some embodiments, the game interface further comprises an interface area having an indicator that indicates a countdown of time before conducting a first round of a plurality of rounds associated with the single game instance. According to some embodiments, the game interface further comprises an interface indicating, after the plurality of rounds associated with the single game instance are complete, at least one winning player.

According to some embodiments, the second display area is adapted to display a counter that indicates to a player, a remaining time permitted for the player to activate the interactive element associated with the single game instance. According to some embodiments, the interactive element associated with the single game instance is received by multiple mobile devices in real time and displayed to multiple players that play the single interactive game instance. According to some embodiments, a number of mobile devices receiving the interactive element associated with the single game instance in real time exceeds 100,000 mobile devices. According to some embodiments, the number of mobile devices receiving the interactive element associated with the single game instance in real time exceeds 1,000,000 mobile devices. According to some embodiments, the chat log is published to a subscriber user of the chat log using a pubsub-type service.

According to some aspects, a new game format is provided that includes a number of interactive game tasks, whereby players are successively eliminated from the game in a survival-type elimination format that is played simultaneously by a massive number of players (e.g., 100,000, 1,000,000 or more, etc.). According to some aspects, a distributed system is provided that enables such a format, the distributed system comprising a multiplayer game server adapted to conduct a single game instance associated with a plurality of mobile device clients, each of the plurality of mobile device clients being operated by a respective player and each having a respective interactive game interface, and an interactive content component adapted to issue events to the plurality of mobile device clients associated with the single game instance, the events causing interactive content to be displayed in real time in each of the respective interactive game interfaces, wherein the interactive content comprises a plurality of game tasks arranged in successive levels within the single game instance, and wherein the multiplayer game server is configured to eliminate a trigger of interactive content associated with the single game instance on a particular one of the plurality of mobile device clients responsive to a determination that a player associated with the particular one of the plurality of mobile device clients is eliminated from the single game instance.

According to some embodiments, the interactive content component permits the eliminated player to observe a remaining portion of the single game instance. According to some embodiments, the single game instance includes a trivia game arranged in successive levels. According to some embodiments, the system further comprises a component adapted to stream in real time, a video associated with the single game instance of the interactive game. According to some embodiments, the video includes live video captured and streamed in real time.

According to some embodiments, the system further comprises a video cluster component that is adapted to receive a video stream comprising the live video and replicating the stream to a plurality of edge server components.

According to some embodiments, at least one of the plurality of mobile device clients is adapted to selectively connect to at least one of the plurality of edge server components to receive the video stream comprising the live video. According to some embodiments, the at least one of the plurality of mobile device clients is adapted to select the at least one of the plurality of edge server components responsive to a network test operation. According to some embodiments, the at least one of the plurality of mobile device clients is adapted to switch, in real-time, connection between the plurality of edge server components responsive to the network test operation.

According to some embodiments, the live video includes a presentation of a live game including a game host. According to some embodiments, the multiplayer game server eliminates the player upon a determination that the player did not select a response within the predetermined time limit. According to some embodiments, the multiplayer game server eliminates the player upon a determination that the player did not select a correct response to the interactive content.

According to some embodiments, the multiplayer game server adapted to conduct a single game instance associated with a plurality of mobile device clients is configured to send a push notification to each of a group of plurality of mobile devices that have previously participated in a previous game instance that a new game instance is being conducted. According to some embodiments, the system further comprises a component that permits a player to suggest at least one trivia question and answer.

According to some aspects, the system may provide the ability for the game to last longer (e.g., participate in extra round(s)) based on some action taken with respect to another player. For instance, if that player refers a new player, the player that is the referring player may be awarded an extra life that permits that player to survive one or more rounds. To this end, some aspects may relate to a distributed system comprising a multiplayer game server adapted to conduct a single game instance associated with a plurality of mobile device clients, each of the plurality of mobile device clients being operated by a respective player and each having a respective interactive game interface, an interactive content component adapted to present a plurality of interactive elements in multiple rounds to each of the plurality of mobile device clients, the plurality of rounds being associated with the single game instance, wherein each of the respective players may be eliminated in any one of the multiple rounds, and a component configured to award at least one player an ability to survive elimination within any one of the multiple rounds.

According to some embodiments, the interactive elements includes a plurality of game tasks arranged in successive difficulty levels within the single game instance.

According to some embodiments, the component configured to award at least one player an ability to survive elimination within any one of the multiple rounds is adapted to award the ability responsive to the at least one player referring another user to play the multiplayer game.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

According to one implementation, a system, architecture and interfaces are provided that are capable of presenting within multiple mobile devices, real-time interactive content. In some implementations, responses from multiple mobile devices are communicated in real time to a distributed game system which can be compiled and reported back to the player population. In addition, game formats are provided where live video is presented in addition to interactive elements to create a new and compelling game format in a mobile device environment.

Figure 1:
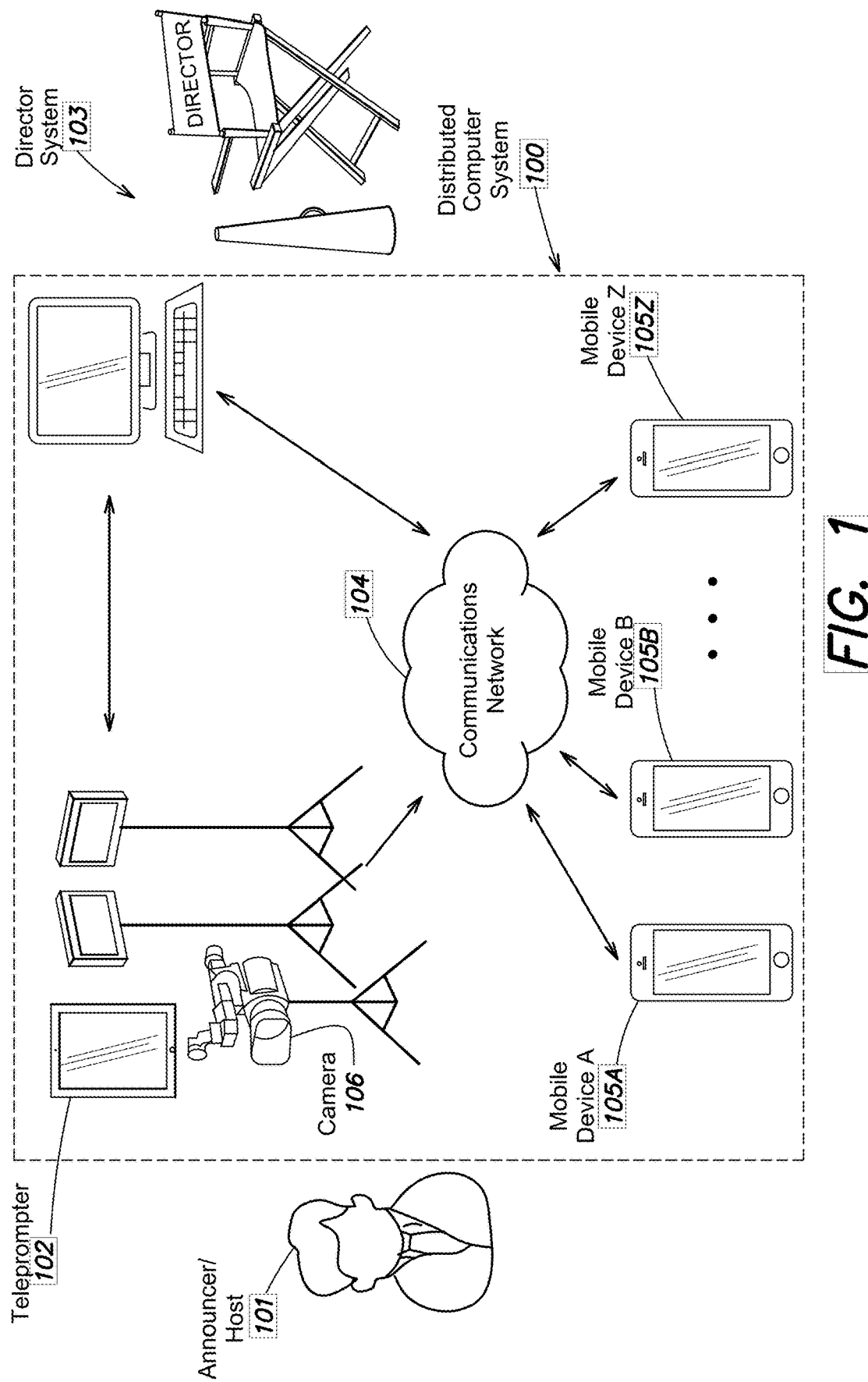
FIG. 1 shows a block diagram of a distributed computer system capable of implementing various aspects of the present invention.

FIG. 1 shows a block diagram of a distributed computer system 100 capable of implementing various aspects of the present invention. In particular, distributed system 100 includes one or more computer systems operated by a user and a game system that is accessed by the computer system through a communication network (e.g., the Internet). Generally, users may access the distributed system through a client application that is executed on one or more of mobile devices (e.g., mobile devices A, B, . . . Z (elements 105A, 105B . . . 105Z). Mobile devices may be, for example, a cellular phone, tablet or any other type of mobile computer system.

Distributed computer system 100 may include one or more elements that permit creation of an interactive production that can be broadcast to thousands of mobile devices concurrently. In particular, system 100 includes a director system 103, a teleprompter 102, camera 106, and one or more computer systems to provide various functions relating to processing events within the game, distributing content to users, determining results in transferring winnings to winning users. According to various aspects, such elements may be implemented within a cloud-based computer system. However, it should be appreciated that the system may be constructed in various ways using various computer system resources among a number of different computing systems. However, according to various implementations, it is appreciated that scalable, cloud-based computer systems may be utilized to implement a flexible and expandable game instance that is sized based on the number of concurrent players.

Director system 103 may be used to architect and control the sequence of distribution of live video and interactive content to each of the mobile devices. In one implementation, specialized software may be provided that allows a director or other personnel to arrange interactive content in such a manner that allows for a production of a "gameshow" type game format which is broadcast to mobile devices. The director system may include one or more organizational constructs that define the sequences by which video and interactive elements are displayed on the mobile devices. As discussed above, video streams may be distributed to the multiple mobile devices and interactive elements may be periodically triggered responsive to a control provided within the production system. In one embodiment, asynchronous event triggers may be sent to mobile devices to trigger the display of the interactive content within the multiple mobile devices.

Further, director system 103 may also control the production aspect relating to an announcer/host 101. Announcer/host 101 may be, for example, a live person within a studio that proctors a particular game instance. For example, unlike other types of mobile device game formats, an actual live host (e.g., host 101) may conduct the actual game, and a video feed associated with that host may be displayed concurrently on multiple devices that are participating within a particular game instance. As discussed above, according to various implementations, the game format may support hundreds of thousands or more participants whose mobile devices receive a video stream from distributed computer system 100.

Figure 2:
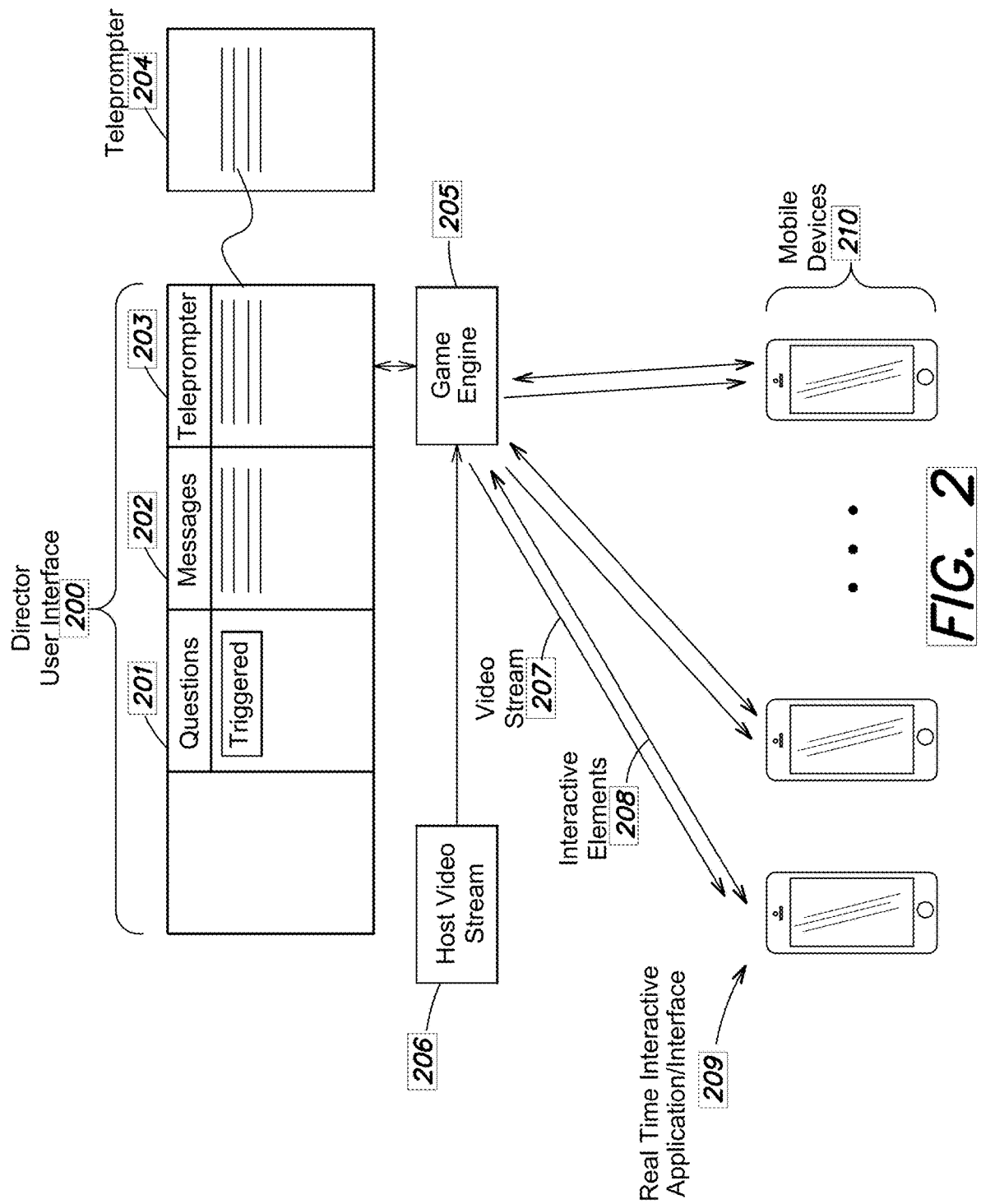
FIG. 2 shows an example implementation of a system that is capable of providing a broadcast of video stream and interactive elements according to various embodiments.

FIG. 2 shows an example implementation of a system that is capable of providing a broadcast of video stream and interactive elements according to various embodiments. In particular, a user interface is provided for a director, such as by the director system 103 discussed above with reference to FIG. 1. As shown in FIG. 2, a director user interface 200 may include one or more organizational constructs including, for a particular game instance broadcast, a column of questions 201 associated with the game instance. Prior to a particular broadcast, one or more questions may be authored and arranged within user interface 200. An indication may be provided within the user interface 200 that shows when particular questions are triggered.

In another column, any messages associated with a particular question may appear within interface 200. For instance, such messages may include any production information relative to the display of particular questions. Interface to may also include a column 203 that controls and identifies what is going to be displayed on a teleprompter 204. For instance, according to one mentation, a studio configuration is provided whereby the host (e.g. host 101) is positioned within a studio set including a camera (e.g., camera 106) and any associated lighting equipment, green screens, or other studio elements. The teleprompter 204 may be used to deliver the script to be presented by the host according to the sequence defined within the director user interface 200. An actual director may control when elements appear within a teleprompter and when questions are triggered within the interfaces of the mobile devices.

As discussed, the system may include a game engine 205 which controls the sequence of the game, records game state, and triggers distribution of game elements to user devices. One or more video encoding devices may be used to produce, from a camera input, one or more host video streams 206. Such strains may include the original captured video of the host 101 along with any backgrounds, effects, or other information to be broadcast. Game engine 205 may control when and how video stream 207 and any interactive elements 208 are distributed to the mobile devices (e.g., mobile devices 210). According to various aspects, a real-time interactive application interface 209 is provided on each of the mobile devices which allows for concurrent display of video and the interactive elements in a composite presentation to the user. Unlike previous game formats, the combination of video stream 207 data and interactive elements 208 are transmitted to and received by a multitude of mobile devices and interacted on in real time.

Figure 3:
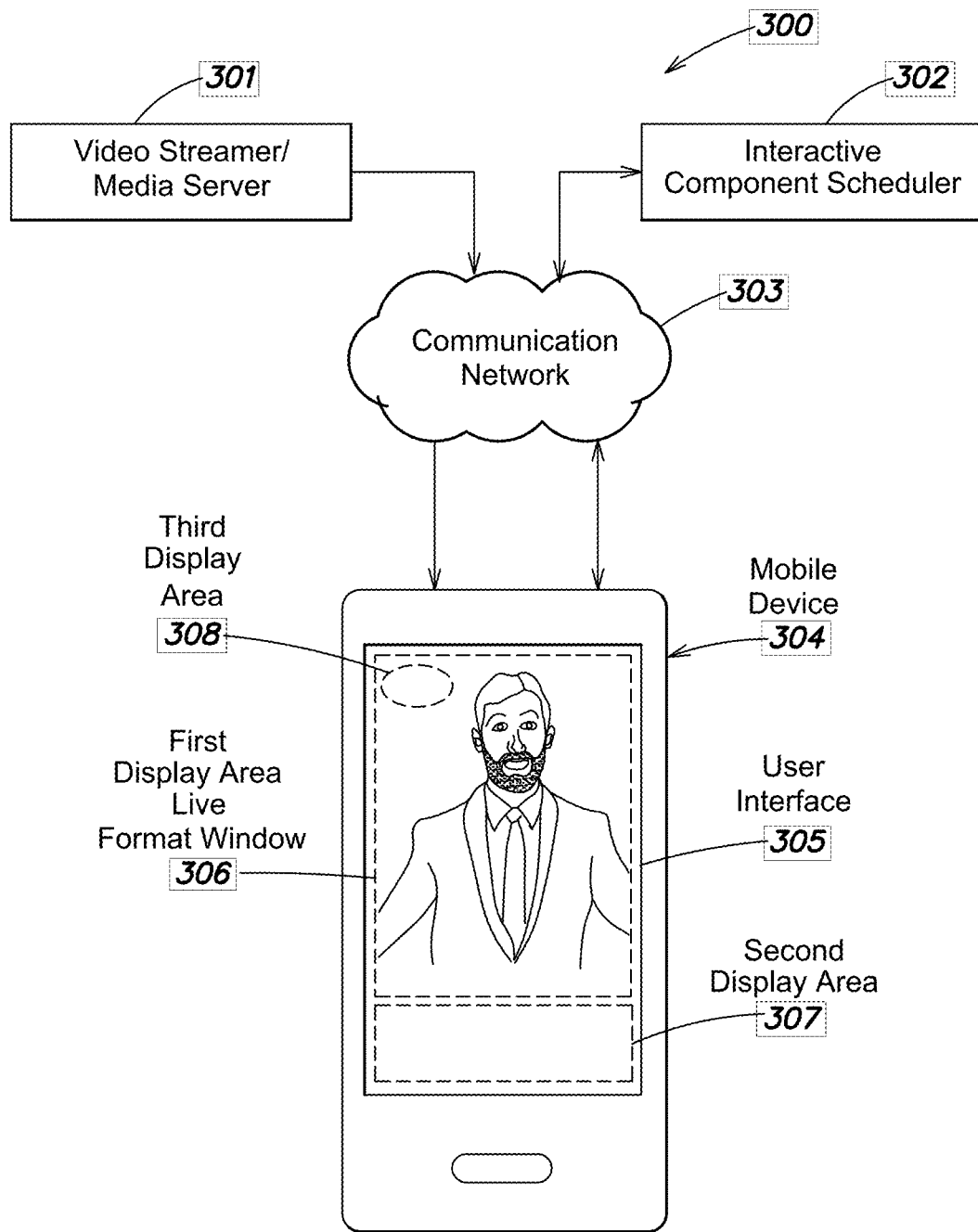
FIG. 3 shows an example interface for providing real-time and interactive data according to some embodiments.

As discussed, various aspects relate to interfaces through which the user can interact with interactive content system. To this end, users may access the interactive content system via the mobile device in real time, and receive real time feedback among a multitude of concurrent users. FIG. 3 shows one example interface for providing real-time and interactive data according to some embodiments.

In particular, FIG. 3 shows a system 300 including a mobile device 304 and associated user interface 305 according to various aspects that combines information received from a video streamer/media server 301 and interactive component scheduler 302 which are received via a communication network 303. As discussed, in various embodiments, video associated with a production of a game is transmitted in real time to mobile devices and displayed within an interface (e.g., interface 305). According to one implementation, user interface 305 includes specific arrangements of live format information along with interactive components. For example, FIG. 3 shows a first display area which includes, for example, a live format window 306. In window 306, the live video stream may be displayed. Also, as discussed previously, the live format window may include a video stream of the host (e.g., a video stream of host 101).

In a second display area 307, one or more interactive elements may be displayed, including any associated controls. For instance, in second display area 307 a chat window may be displayed below or on top of the live format display window 306. In one embodiment, the windows are structured as layers and certain layers may be opaque and may be positioned as an overlapping layer on top of the live format display window 306. Further, interface 305 may include a third display area 306 which includes one or more indicators relating to a particular game instance. For example, it may be useful to display to all users (e.g. and broadcast to all mobile devices) the total number of users simultaneously connected to the game instance.

Figure 4:
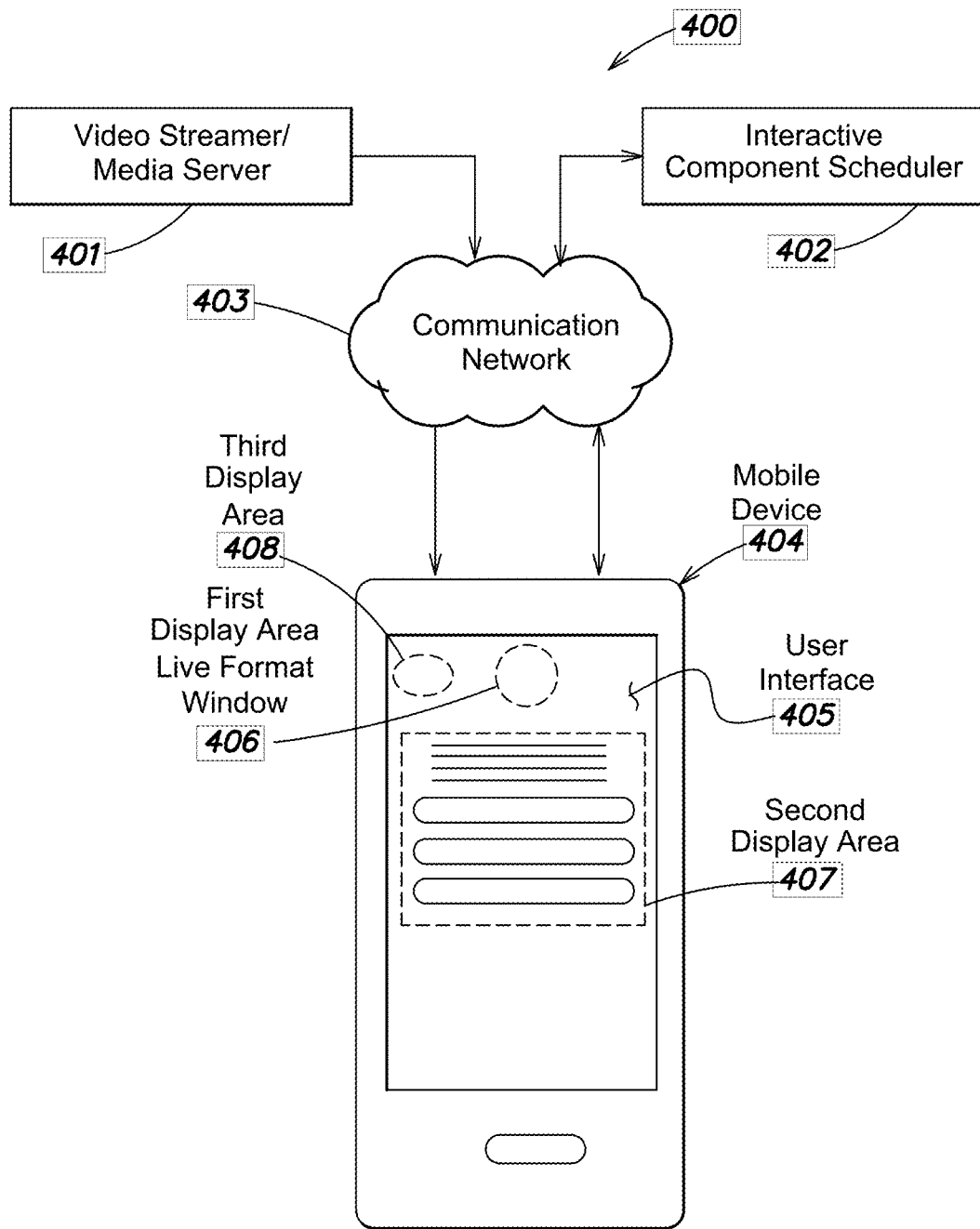
FIG. 4 shows another example interface for providing real-time and interactive data according to some embodiments.

FIG. 4 shows another example interface for providing real-time and interactive data according to some embodiments. In particular, FIG. 4 shows a system 400 including a mobile device 404 and associated user interface 405 according to various aspects that combines information received from a video streamer/media server 401 and interactive component scheduler 402 which are received via a communication network 403 similar in function to similarly-named elements of FIG. 3. According to the embodiment shown in FIG. 4, user interface 405 may have a different configuration, wherein a first display area which may be for example a live format window 406, may be displayed in addition to a second display area 407 includes one or more interactive elements. As discussed further below, such interactive elements may be elements associated with a game wherein the user of the mobile device may have to provide feedback which is then transmitted to a game server. The game server may process a multitude of responses received by interactions of users with the second display area 407. As shown, the live format window 406 may be positioned above the second display area 407 in a type of minimized format. According to one aspect, the interface format shown by way of example in FIG. 3 is followed sequentially in the production by a presentation of a multiple choice question format shown by way of example in FIG. 4. In this manner, the live format of the host is followed by an interactive interface having a minimized format of the host. It should be appreciated that such interfaces may have other features or elements, and may be presented in different sequences.

Figure 5:
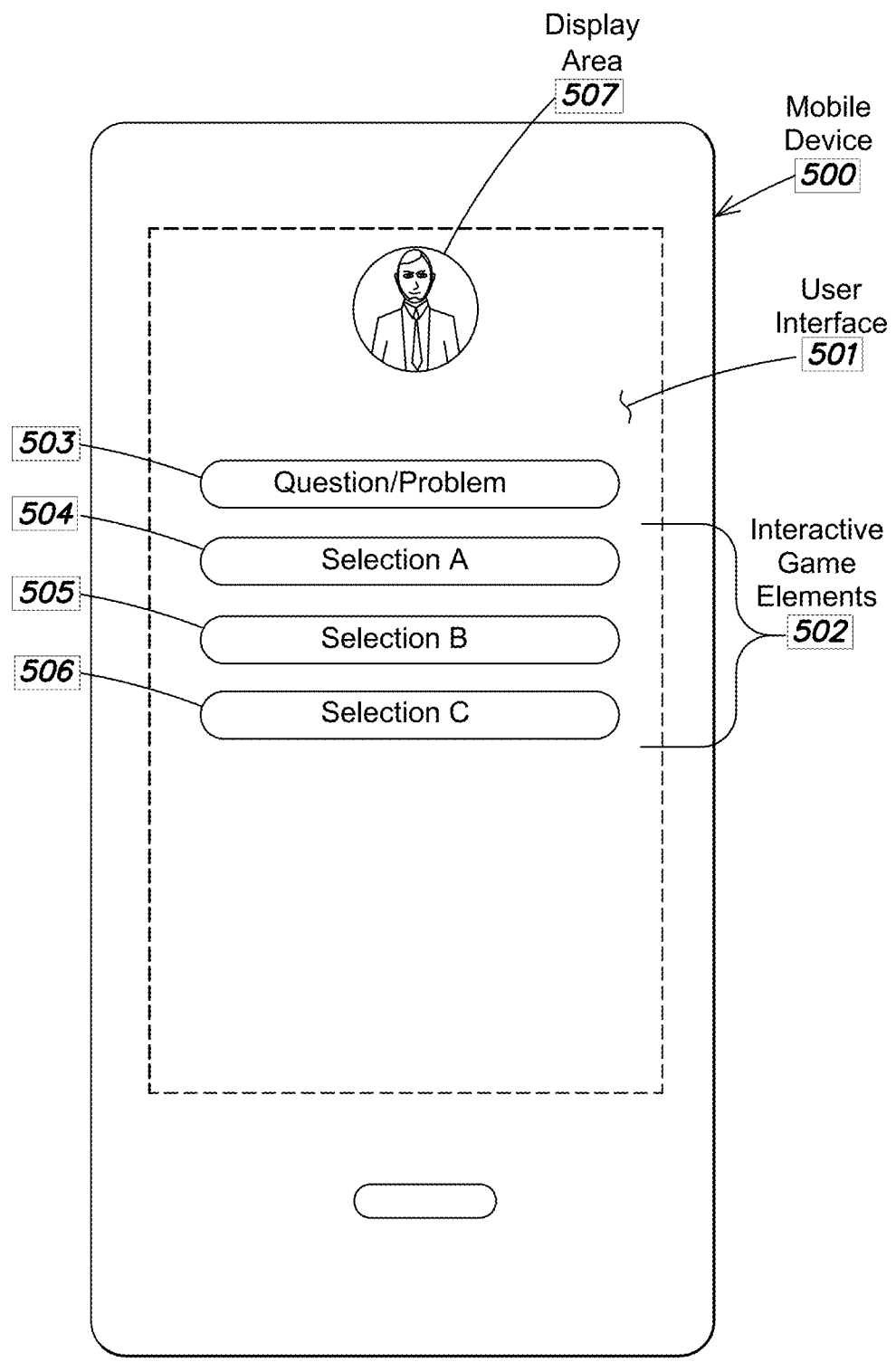
FIG. 5 shows another example interface for providing real-time and interactive data according to some embodiments.

FIG. 5 shows another example interface for providing real-time and interactive data according to some embodiments. In particular, FIG. 5 shows a mobile device 500 with user interface 501 that depicts a more detailed display of interactive game elements (e.g., such as those shown by way of example in FIG. 4). In particular, user interface 501 may include an area of the display which includes one or more interactive game elements 502. In one example game format, a question or other type of problem is provided and presented to the user within the display of the mobile device. As discussed earlier, one particular format includes multiple-choice questions that are presented in multiple rounds.

To this end, interface 501 may include a display element 503 that displays the question and/or problem to be solved. Further, interactive game elements 502 may include a number of selections (e.g., selections a-C, elements 504-506) that are presented as control elements that can be selected by a user within the interface of the mobile device. Upon selection of one of these elements, a message may be transmitted from the mobile device to the game server which then combines responses into an aggregated response. The game server may also track an individual's performance within the game sequence, such as if the player responded with an incorrect answer.

User-interface may also include another display area (e.g., display area 507) that is used to provide additional information to the user. For instance, display area 507 may include a minimized version of the live video feed. In addition, display area 507 may be used to indicate countdown information that identifies the status of the timer that is used to limit the response time of the player. That is, the player is required by the game system to respond within a predetermined amount of time. Such a countdown may be shown, for example, using a numeric indicator, a highlighted circle surrounding the display area 507, or other method (e.g., a sweeping hand displayed as an opaque layer over the video content). It should be appreciated that any method for combining the timer with the live video feed information may be used. Also, the timer may be a separate item within the interface and/or may be combined with any other type of interface element.

Figure 6:
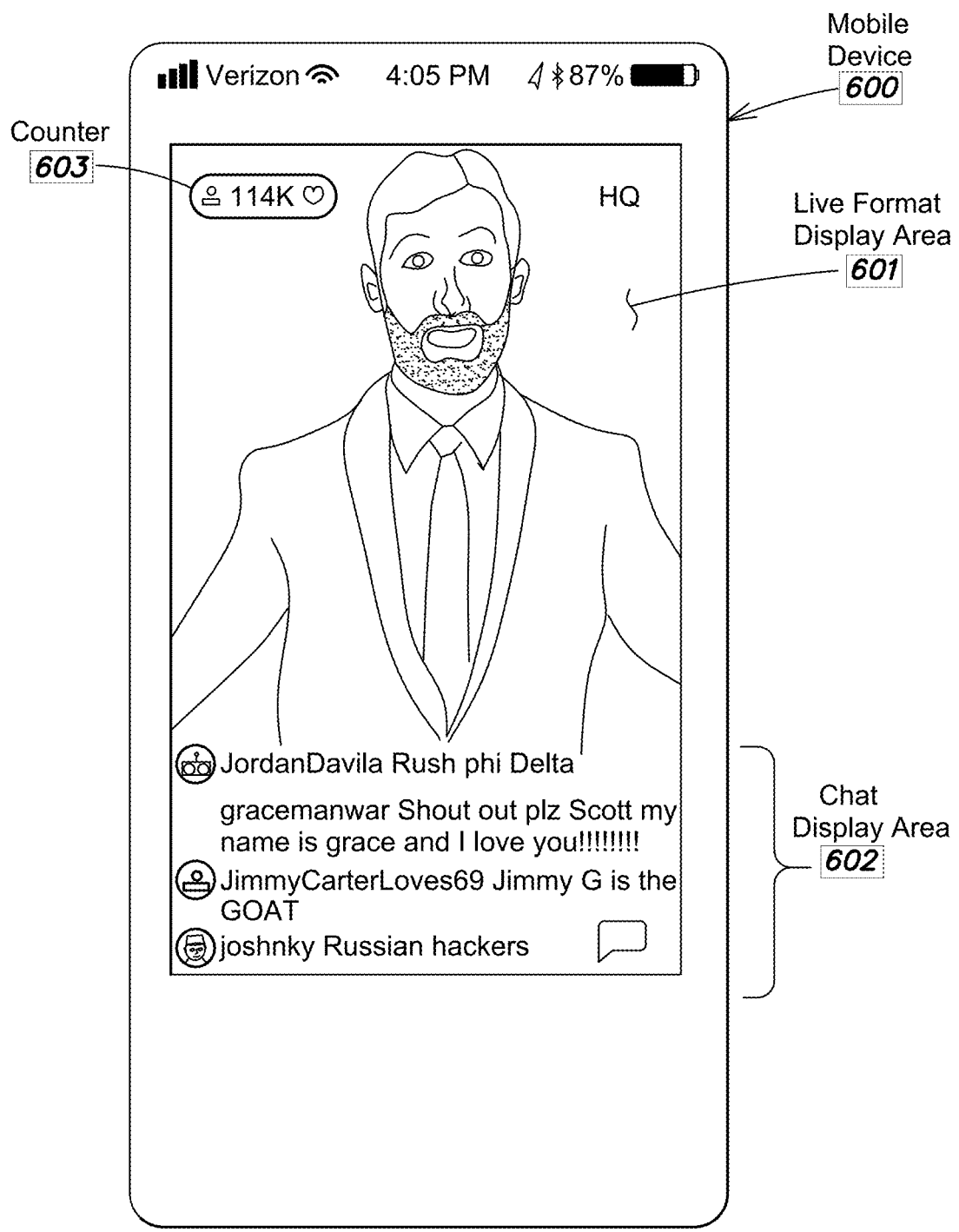
FIG. 6 shows one example interface featuring a host along with various interactive and display elements according to some embodiments.

FIG. 6 shows one example interface featuring a host along with various interactive and display elements according to some embodiments. In particular, FIG. 6 shows a mobile device 600 with a live format display area 601. Such a life format display area 601 may be combined with other elements such as a chat display area 602 which shows chat activity from other players involved within the interactive game instance being broadcast. Further, the interface may include any number of indicators and/or controls such as counter 603 which displays account of the number of current simultaneous users within the game. Such a counter may be updated in real time as users enter or leave the game, and thus such an indication may provide a more compelling game format, as the popularity of a particular game instance is represented in real time as mobile devices connect to the broadcast of the game instance in real time.

Figure 7:
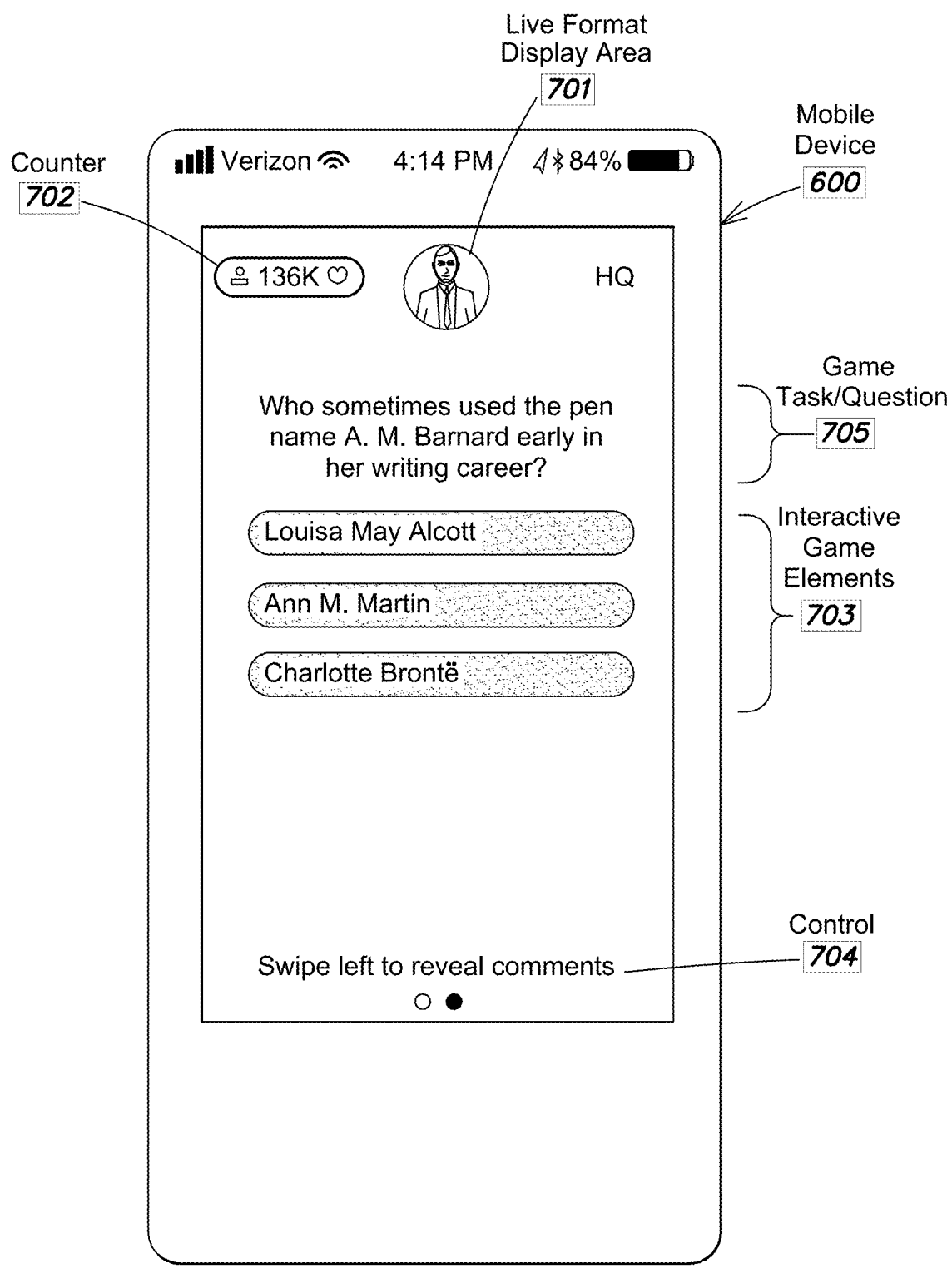
FIG. 7 shows another example interface for providing real-time and interactive data in a multiple choice question format according to some embodiments.

FIG. 7 shows another example interface for providing real-time and interactive data in a multiple choice question format according to some embodiments. In particular, FIG. 7 shows a mobile device 600 with a live format display area 701 and a number of interactive game elements represented within the same interface. Notably, the system may perform an interface transition with device 600 from an interface such as that shown in FIG. 6 to that shown in FIG. 7, where the live format display area is transitioned to a larger area 601 than that of area 701. More particularly, the interface may be transition from a host announcer mode to an interactive game mode and display, while simultaneously displaying the life format information.

The interface of mobile device 600 may, as shown in FIG. 7, present one or more game tasks (e.g. game task/question 705) that the player/user needs to respond within a predetermined time. Users may select or otherwise interact with one or more interactive game elements 703. As discussed above, the interactive aspects of the game may include multiple-choice questions wherein users need to select at least one interactive game element within a predetermined amount of time.

Optionally, the interface may include a controls 704 that permits the user to selectively display a comments window (e.g., chat window). Such a window may be enabled using the swipe operation on a portion of the interface.

Figure 8:
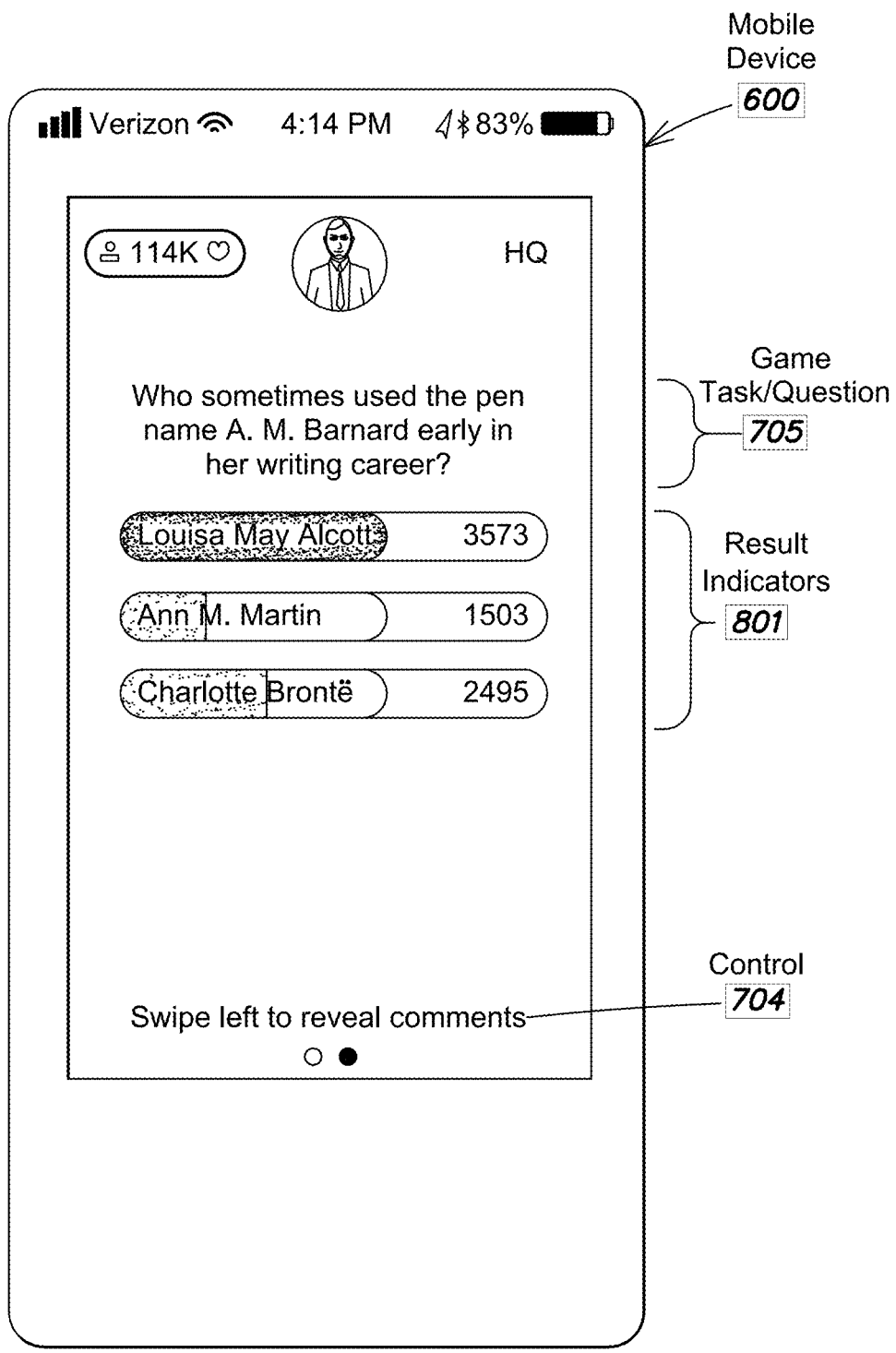
FIG. 8 shows an example user interface for providing results of a multiple choice question format according to some embodiments.

FIG. 8 shows an example user interface for providing results of a multiple choice question format according to some embodiments. In particular, FIG. 8 shows a mobile device 600 with a result of a previous interactive game level associated with a multilevel game. Notably, the system may perform in interface transition with device 600 from an interface such as that shown in FIG. 7, which accepts a selection of an interactive game element associated with particular game task, to an interface such as that shown in FIG. 8 which shows the collective results from multiple mobile device users.

In one implementation, the interface shown in FIG. 8 may include the same game task/question 705 as shown in FIG. 7, along with one or more result indicators 801 that identify correct and incorrect responses. For instance, the more darkly shaded selection "Louisa May Alcott" may be indicated as being the correct answer, whereas the selections "Ann M. Martin" and "Charlotte Bronte" are indicated as being incorrect. FIG. 8 may also include a "comments" or chat window that can be activated using a swipe operation using control 704.

Figure 9:
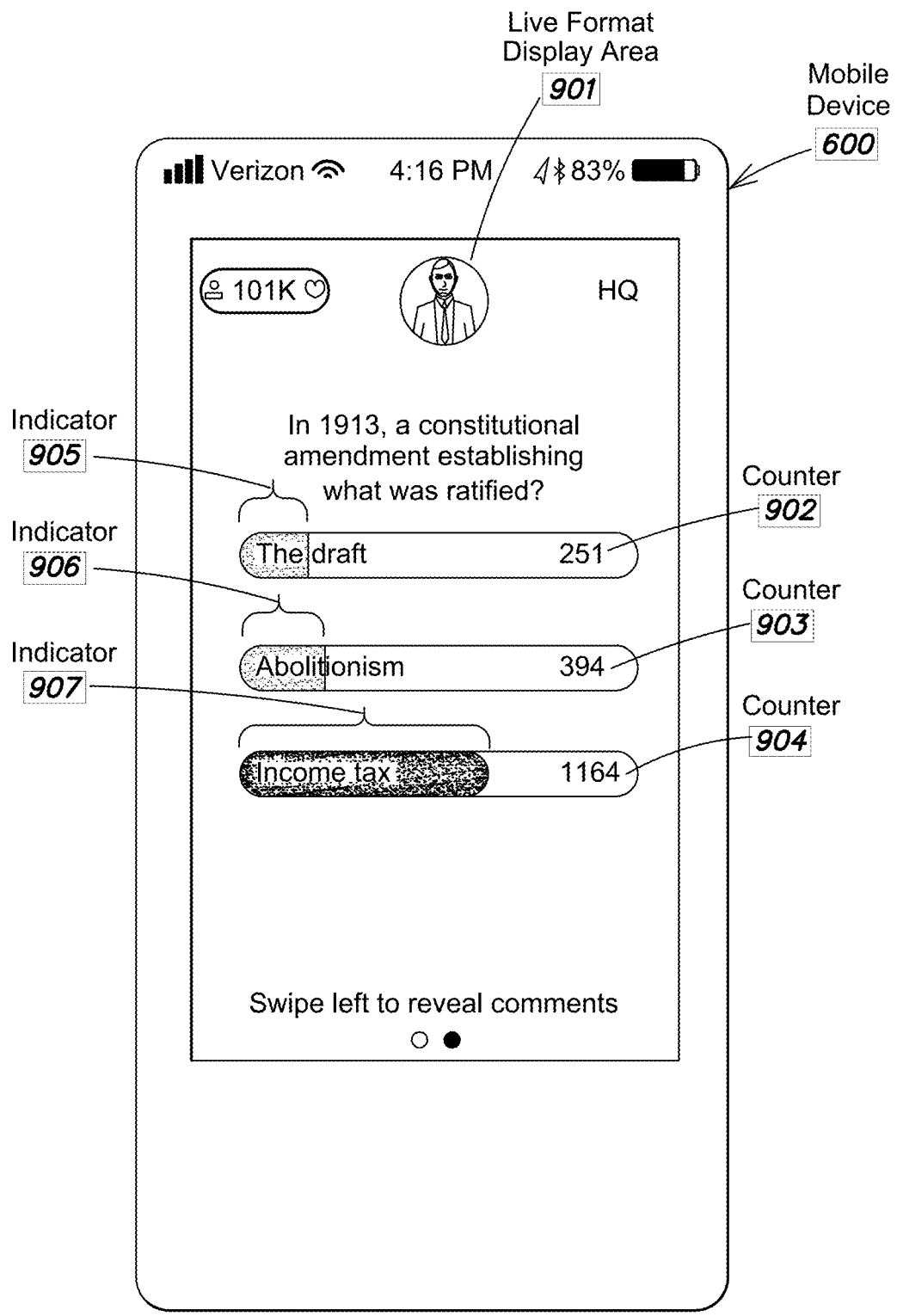
FIG. 9 shows an example user interface that include various indicators and counters according to some embodiments.

FIG. 9 shows an example user interface that include various indicators and counters according to some embodiments. Optionally, in a results interface such as that shown in FIG. 8, the results interface may include one or more additional indicators and counters to reflect responses provided by the multitude of users. In particular, mobile device 600 may include a results interface screen that shows for each of the possible choices of interactive elements, a number of counters that indicate the number of people that if selected that particular interactive element. For instance, for counter 902, 251 players have selected this option. For counter 903, 394 players selected this option, and for counter 904, 1164 players have selected this option. According to one possible game format, players that select incorrect options are eliminated from the game. Also, because responses are collected and analyzed in real time, it is possible to display to other users an elimination status of the game.

It should be appreciated that the interface can include other types of indicators, such as, for example, indicators 905-907 that show graphically along a representation of interactive element, a shaded number of players that selected this particular interactive element. In this way, a more easily discernible display may be provided to the player. Although shaded elements are shown by way of example, other types of indicators may be used (e.g., colors such as green (correct) and red (incorrect)) may be used.

Figure 10:
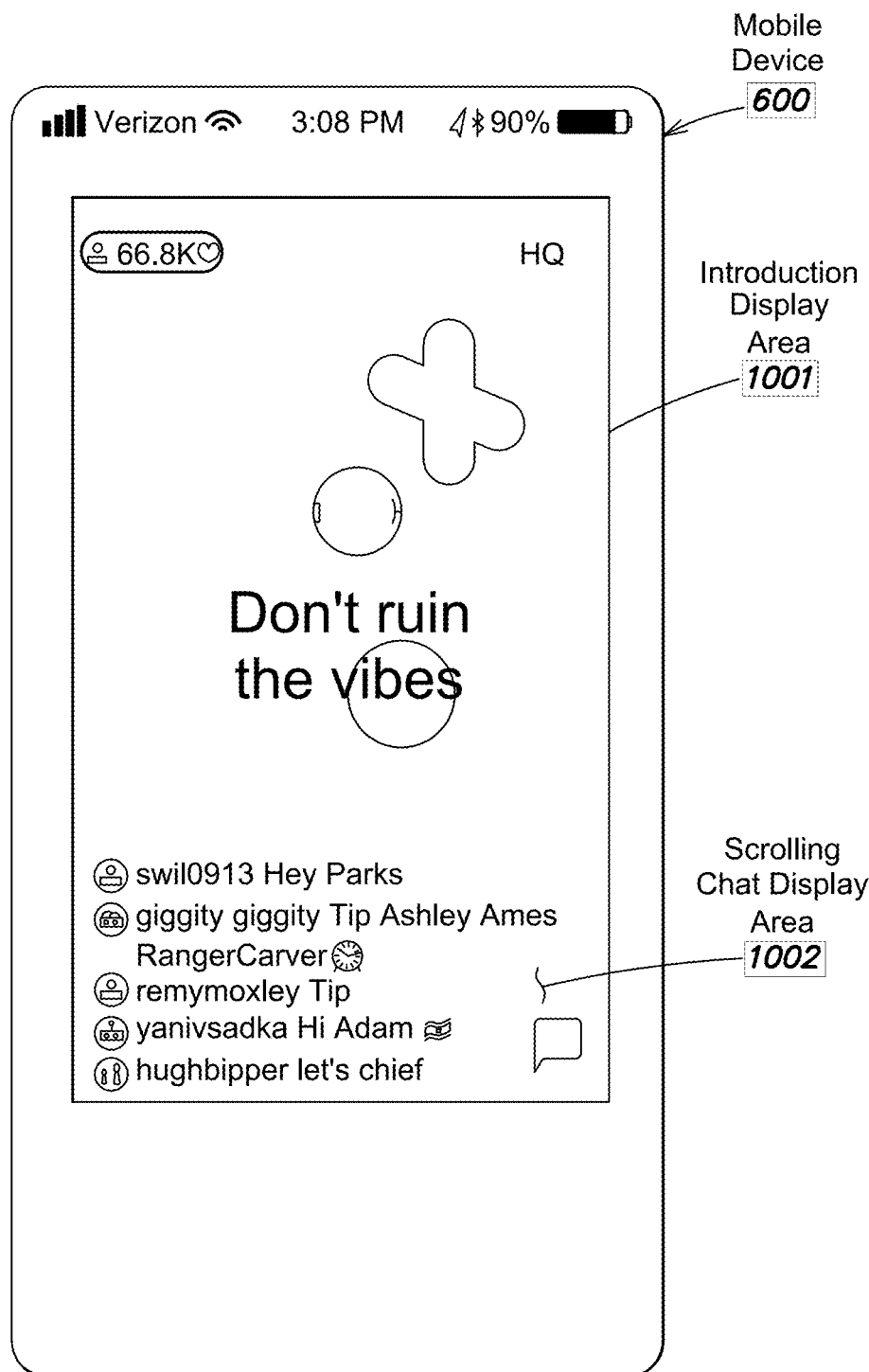
FIG. 10 shows an example user interface used to present an interactive game according to various embodiments of the present invention.

FIG. 10 shows an example user interface used to present an interactive game according to various embodiments of the present invention. In particular, FIG. 10 shows a mobile device 600 with an introductory display area 1001. Such a display may be shown to multiple users prior to transitioning into the game. That is, the introductory screen may be used as a "waiting area" prior to conducting the game instance. Such an interface may be useful, for example, for providing entertainment prior to the game. Such entertainment may include, for example, a scrolling chat display area 1002 that displays chat messages sent by other users waiting within the same game area. Display area 1001 may also include one or more controls that allow the user to post their own chat information within the scrolling chat area 1002. Users may be permitted to selectively scroll through each of the chats to see the chronologically ordered chats received for a particular game instance. The display shown in FIG. 10 may be shown to the users prior to display of the game including the "live format" information including the host/announcer presentations associated with a mobile interactive game show such as that shown in FIG. 6. The scrolling chat display area may be retained between the transitions of the interfaces within the game show presentation (or any other type of presentation).

Figure 11A:
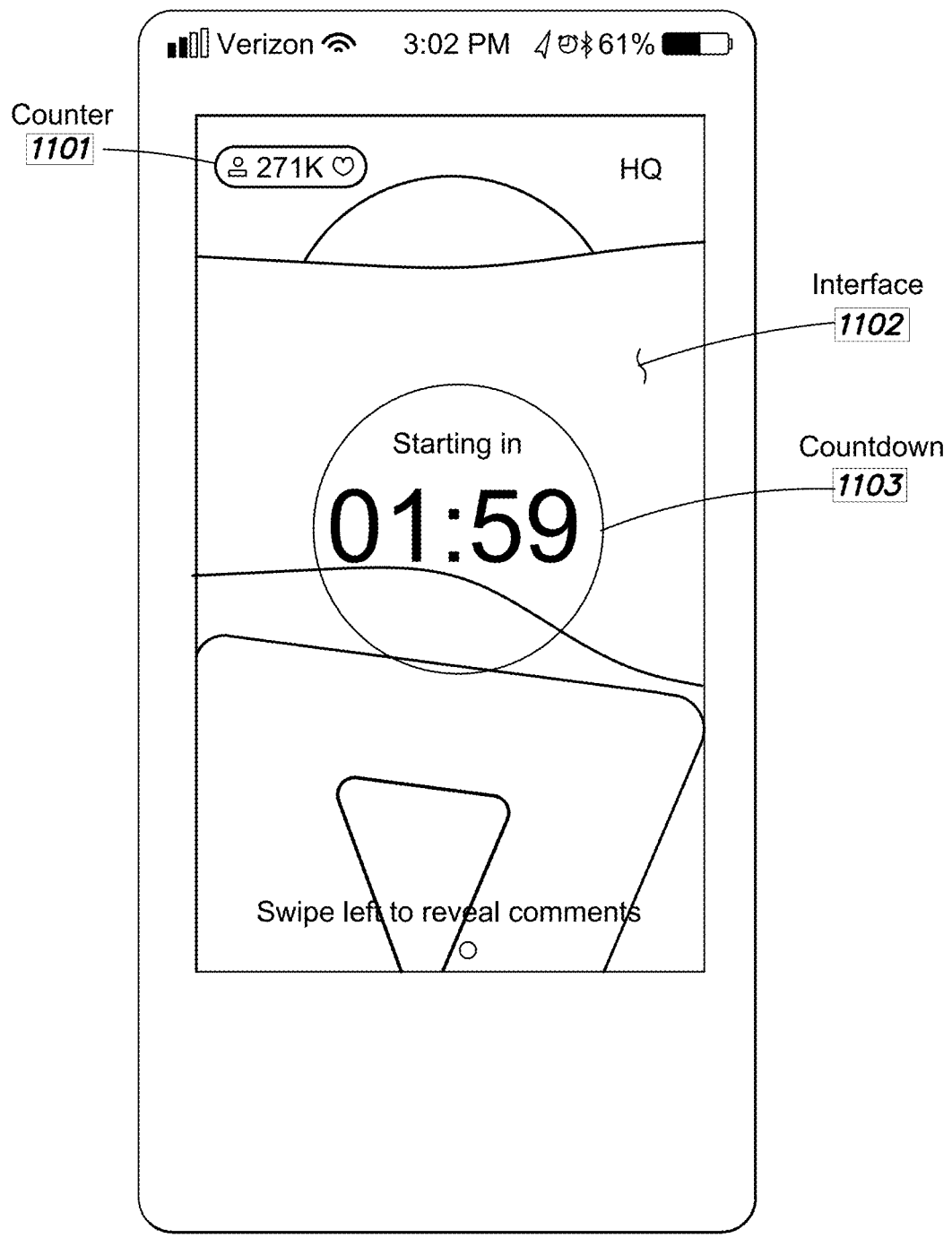
FIG. 11A shows an example user interface that shows an interactive game element according to various embodiments.

FIG. 11A shows an example user interface that shows an interactive game element according to various embodiments. Optionally, the system may present a "countdown" interface 1102 which identifies to the multitude of users that the game is about to begin. For instance, the system may transition the players from a waiting area screen such as that shown by way of example in FIG. 10 to that of a countdown interface 1102 as shown in FIG. 11. In one implementation, interface 1102 includes a countdown element 1103 that indicates to the users the amount of time until the start of the game broadcast that will be transmitted to the multitude of mobile devices. Optionally, within the countdown interface 1102, there may be one or more controls were indicators including, for example, counter 1101 that indicates the number of present players (e.g., subscribed mobile devices attached to the game instance). Such an indicator may be retained in multiple interfaces and may be used to generate and retain interest within the game.

Figure 11B:
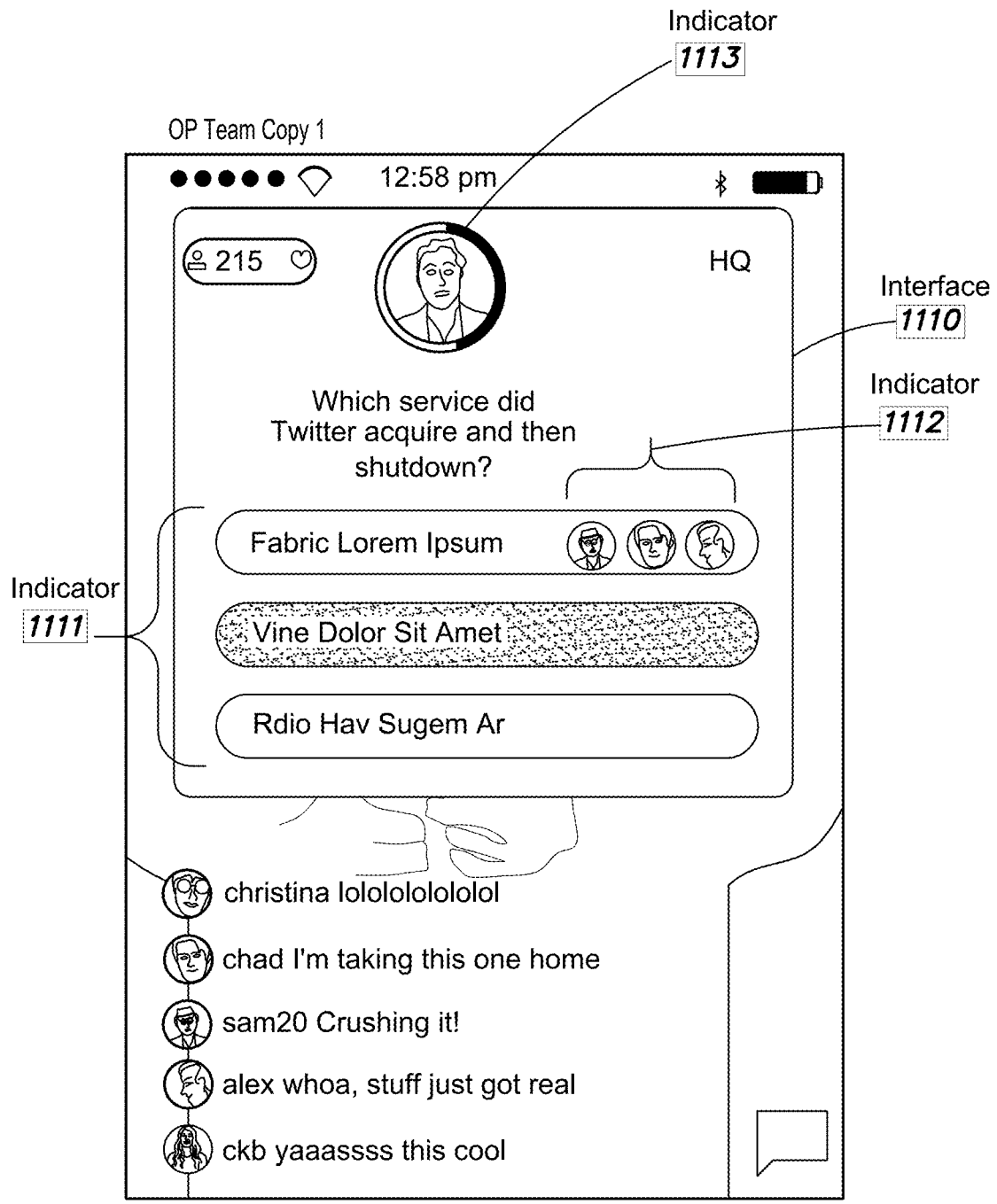
FIG. 11B shows an example user interface that shows interactive content posted by other user in real time according to various embodiments.

FIG. 11B shows an example user interface that shows the various interactive game elements according to various embodiments. Optionally, the system may present an interactive game element interface 1110 which includes one or more indicators 1111 that indicate possible answers to a particular question. Notably, the indicators 1111 may also include one or more indicators 1112 that indicate what other users in the user's allowed list of users (e.g., a permitted users list) that have allowed that particular user to view their answers in real time. According to one aspect, the functionality is provided for other users to view a particular user's answers in real time so that they can collaborate more effectively within the interactive interface. The indicators should optimally display log answers in real time in that there is a finite amount of time by which a user can provide a response. That is, as users log answers, updates are sent by a server entity to interface 1110 in real time during a timeout period as reflected by indicator 1113.

Figure 11C:
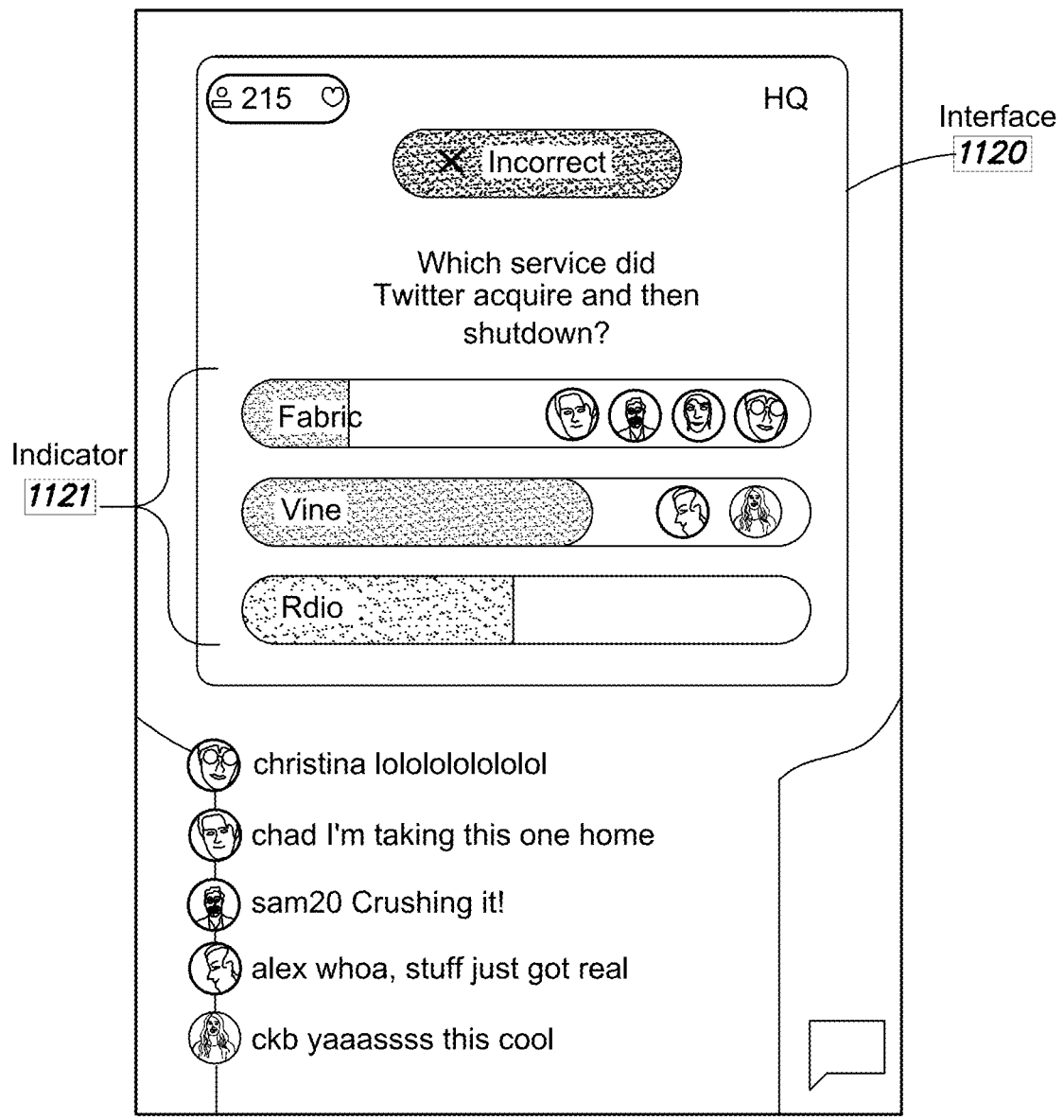
FIG. 11C shows other user's interactive responses at a conclusion of a question according to various embodiments.

FIG. 11C shows another example user interface showing a result interface associated with the interface shown in FIG. 11B after the timeout period has expired. In particular, interface 1120 includes indicators 1121 that show the answers posted by other users in real time. Furthermore, in an alternative embodiment, each of the indicators shows which users on the particular user's permitted user list answered which questions. In this way, permitted users within the group may be allowed to share answers and to see others' progress in the game in a more real-time manner. It is appreciated that because some users may not be within the same location, that it may be beneficial to play the multi-player game as a subgroup of the entire group of users. Because, according to one embodiment, only permitted users within the group can see each other's answers, these users may collaborate to provide a more interesting game experience. The architecture may be capable of hosting an unlimited number of groups to play the interactive game within real time constraints. That is, among the plethora of users, there may be an ever-changing number of permitted user lists depending on which users are connected to a particular game instance.

Figure 11D:
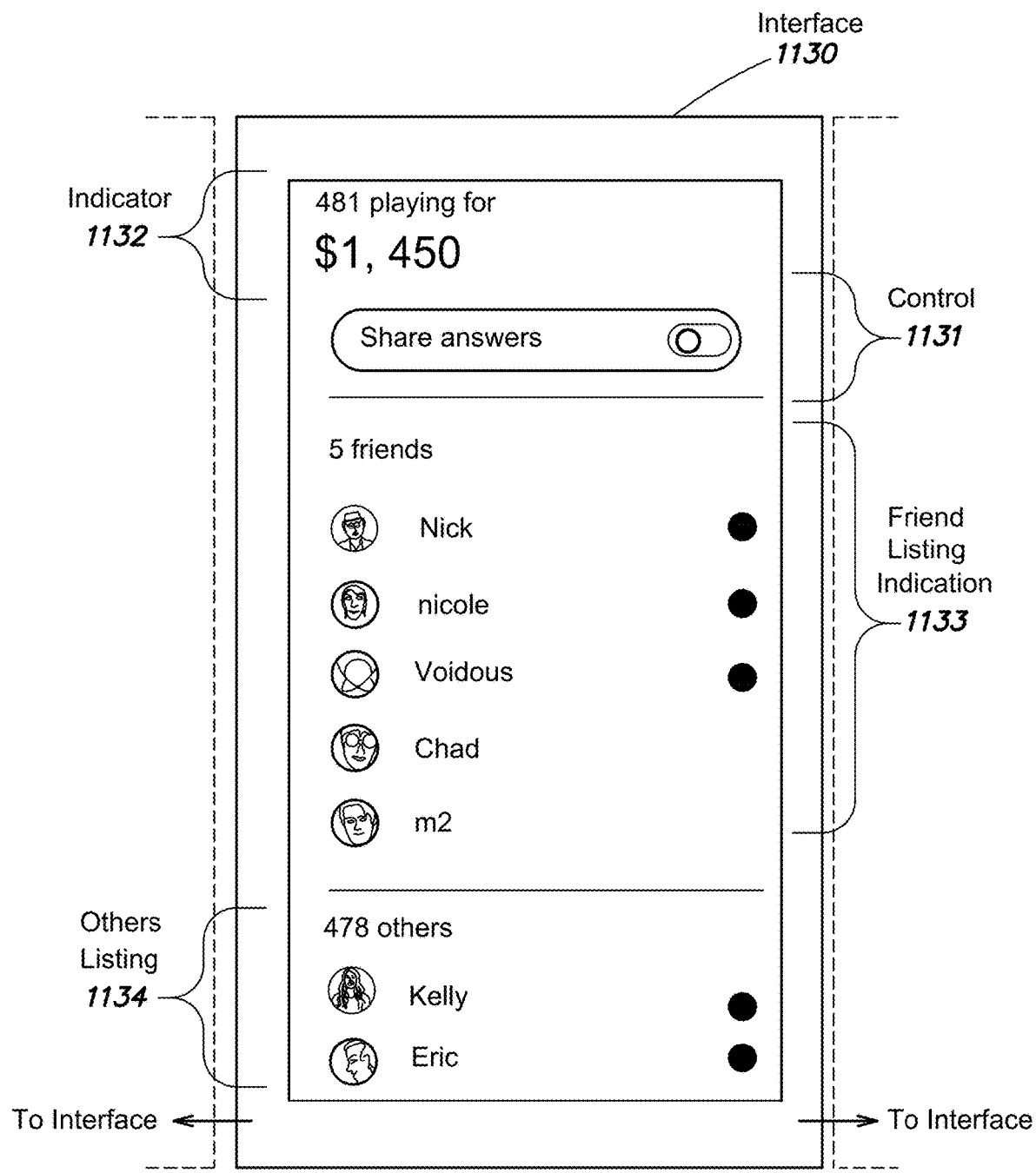
FIG. 11D shows an example interface used to manage a group pf permitted users according to various embodiments.

FIG. 11D shows another example user interface according to various embodiments that permit the user to you permitted users. In particular, FIG. 11D shows an interface 1130 that lists one or more users that are permitted to view interactive content in real time from the current user. To this end, interface 1130 may include one or more controls (e.g., control 1131) that permits the user to share answers or provide any other type of content to other users in real time. In one embodiment, interface 1130 includes a friend listing indication 1133 which may include a list or other indications of various other users that are permitted to give you the real time content of the selected user. Further, the interface may also include a listing of other users 1134 who may be active at a particular time and/or may be permitted to view the real time content of the selected user, if authorized. In one embodiment, interface 1130 may be accessed from a main game interface upon a swipe selection (e.g., a swipe movement in one or more directions from the main screen interface). Interface 1130 may also include one or more controls that removes access to the user, authorizes additional users, searches a listing of existing users for the purposes of creating groups, controlling access to users, and maintaining access lists. Although real-time interactive content such as answers may be shared among users, it should be appreciated that other types of user data may be shared selectively among groups of users such as, for example, other inputs/outputs such as texts, video, audio feeds, comments, documents, or other types of user input/output.

Figures 12A, 12B:
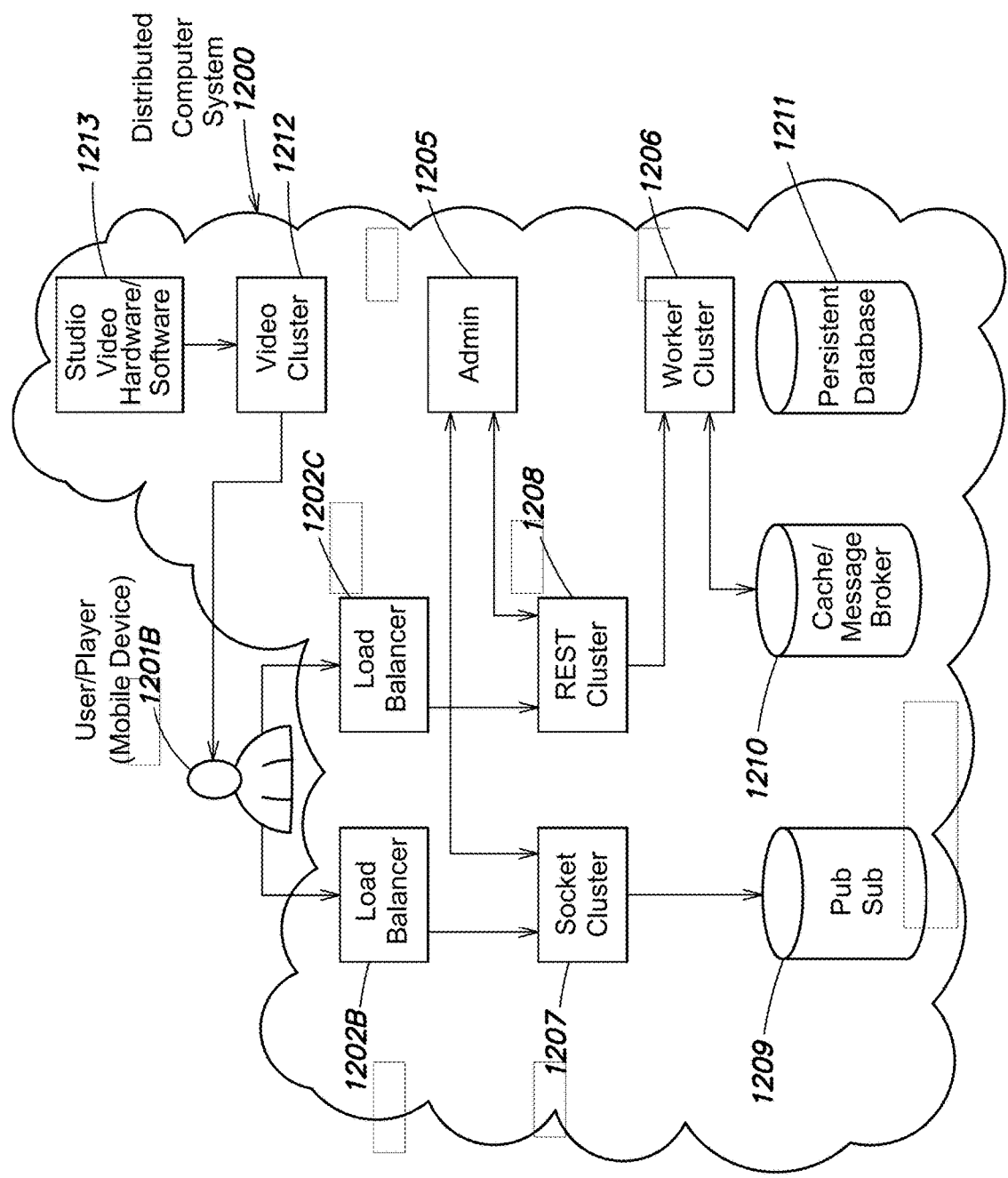
FIGS. 12A-12C shows example computer-based architectures that may be used to implement various embodiments.
Figure 12C:
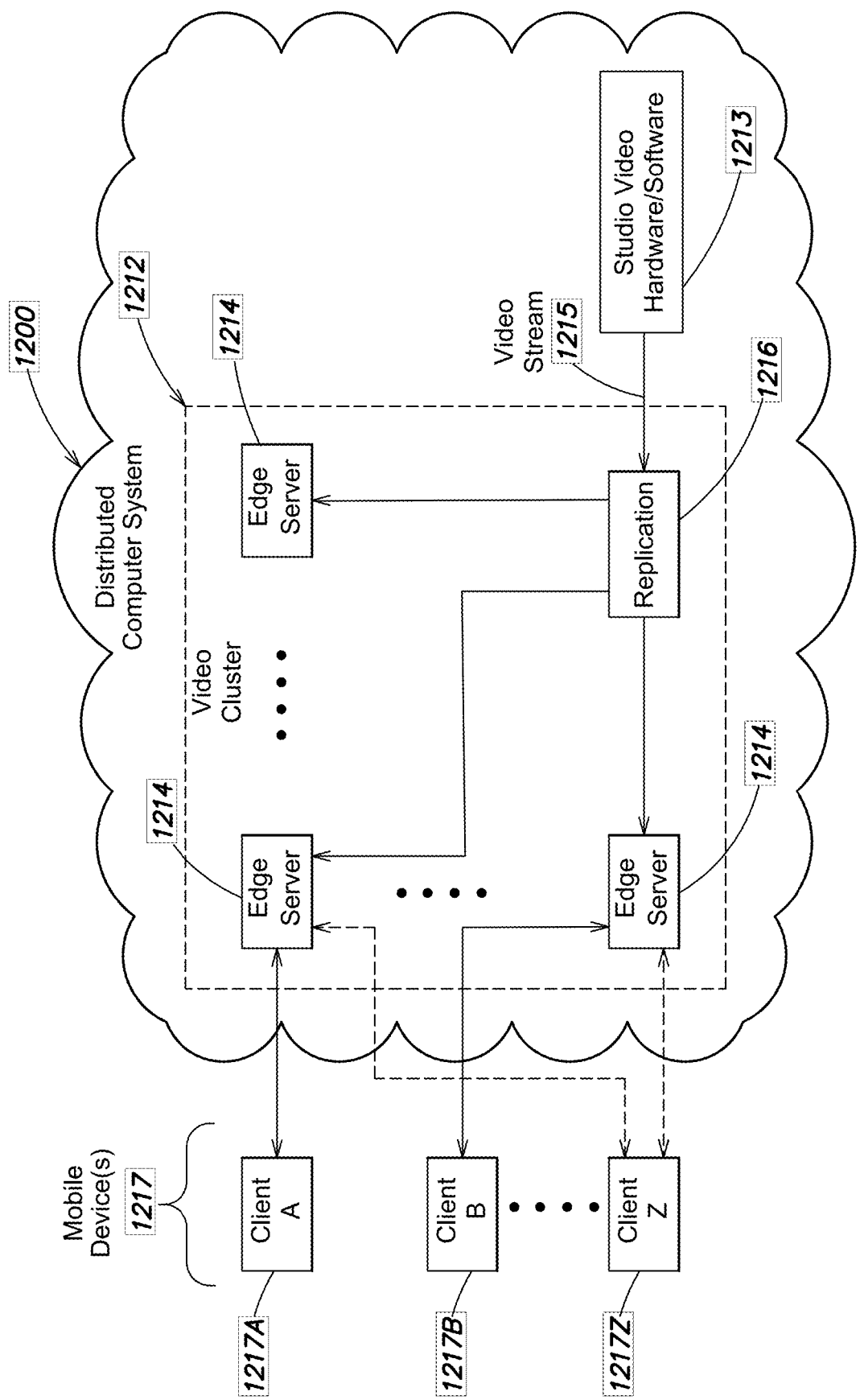

FIGS. 12A-C show example computer-based architectures that may be used to implement various embodiments. In particular, a distributed computer system 1200 may be provided that permits a multitude of users/players to operate mobile devices to connect to a particular game instance (collectively, user/player/mobile devices). As discussed above, conventional systems cannot typically scale to thousands or even hundreds of thousands of users for a particular game instance. According to various aspects, a cloud-based expandable infrastructure is provided that permits expansion necessary to support an arbitrary number of users.

Also, according to one aspect, it is desired that there is a low latency with transmitting information to users as well as receiving interactive responses from users. For instance, in a particular example, there may be a 10 second allowance for a user to respond to a particular interactive element. In this example, that means that the user should receive the interactive element and responded within a predetermined amount of time. In one embodiment, a threshold amount of time is set and maintained on a server instance and if that threshold is exceeded, the user has not responded within the predetermined amount of time. For instance, the threshold time may be, for example, 13 seconds, allowing for a three (3) second delay or grace period between the transmission and reception of an interactive element. Depending on the infrastructure, more or less of a grace period may be used.

As shown in FIG. 12A, according to one implementation, a user/player/mobile device 1201 a communicates to a load balancer 1202A to access the system. Load balancer 1202A may be for example, the well-known Elastic Load Balancer (ELB) provided within AWS available from Amazon. Such a load balancer may provide load-balancing services between mobile devices and application entities executing within the distributed computer system 1200. In one implementation, mobile devices may use socket-based communication to communicate with a game server entity that provides asynchronous messages that cause various displays to be triggered in the interfaces of the mobile devices.

Practically, the systems may communicate using a publish and subscribe model whereby mobile devices subscribe to particular channels of content (e.g., interactive elements, videos, tracks, animations, or other content types) and listen for updates to such channels and display them on their respective interfaces. Once subscribed, any messages are communicated through the sockets upon which the multiple devices are listening. In one example implementation, messages may be sent using HTTP although other protocols may be used.

In one implementation as shown in FIG. 12A, a socket-based cluster may be used to communicate socket messages to the multitude of mobile devices. Also, a non-blocking, low latency event loop component may be used to receive and process asynchronous messages from the game server. In one implementation, Node.js 1203 (available commercially from the Node.js Foundation) may be used for asynchronous communication of messages to a subscription server. In one implementation, the mobile device may subscribe to a particular game instance comprising one or more channels of content, and may thereafter listen for updates and receive the channelized content for display in one or more interfaces of the client.

In some embodiments as shown by way of example in FIG. 12B, clients are capable of subscribing to one or more entities within the distributed computer system 1200. For purposes of performance, services may be scaled based on the number of concurrent users, and therefore multiple server instances may be provided to provide such service. Similar to FIG. 12A, system 1200 as shown in FIG. 12B may implement a number of load balancing entities (e.g., load balancers 1202B, 1202C) for the purpose of creating socket connections between mobile devices and server entities. Also, the well-known SocketCluster system 1207 (available commercially from SocketCluster.io) may be used to implement horizontally-scalable client and server communications. Depending on the number of concurrent users, the number of entities within the socket cluster 1207 may be expanded. Socket cluster 1207 is responsible for processing and providing asynchronous messages to a publish/subscribe cluster 1209. Publish/subscribe cluster 1209 may be, for instance, implemented using the well-known pubsub-type cluster-based software system that functions as message-oriented middleware is available commercially from a number of sources including Redis, Google and others.

Further, system 1200 may also include a REST-based cluster 1208 that is capable of storing information, communicating to worker cluster 1206 that distributes messages to subscribed sockets to mobile devices. System 1200 may also include one or more cache/message brokers 1210 that organize communications into channels (e.g., message broker systems such as the well-known Redis message brokering system) that can be subscribed to by mobile devices. Once subscribed to a channel, mobile devices receive these asynchronous messages posted to the channel by other users. Such messages may include content that can be displayed in the interfaces of the mobile devices. In one example implementation, information posted by one user may be distributed in real time to other users (e.g., a chat entry). Other types of information (e.g., interactive element responses, counters that count the number of players, accumulators that total particular responses, etc.) may be calculated by the game server and republished in real time to the mobile devices, which can display this information in real time on their displays.

Further, system 1200 may also include a video cluster 1212 that is responsible for distributing video streams to each of the mobile devices in parallel to the distribution of asynchronous messages via the pubsub server 1209. The video cluster 1212 may be capable of transmitting video in any number of formats and resolutions, depending on the capabilities of the mobile device client. The video cluster may receive one or more video streams from hardware/software associated with the studio (e.g., studio video hardware/software 1213) associated with a game broadcast.

According to some embodiments, the video cluster 1212 may be capable of receiving a video stream from one or more mobile user devices for the purpose of retransmitting it to other mobile device users. As previously discussed, the system may include a director type role and associated computer system that controls the production of the game. To this end, system 1200 may include an admin system 1205 that permits a director user to the distribution of various channels of content. In one example, the admin system 1205 may be capable controlling a video input provided by one or more mobile devices and redistribute the provided video stream through the video cluster to other mobile devices. It should be appreciated that other system architectures and elements may be used either in place of or in addition to the architectures and elements described here.

FIG. 12C shows another example architecture that may be used to distribute video information to multiple end user devices within a distributed computer system (e.g., system 1200). For instance, as shown in FIG. 12C, a distributed computer system 1200 may include a video cluster component 1212 that is configured to receive one or more video streams from hardware/software associated with the studio (e.g., studio video hardware/software 1213) associated with a game broadcast. Cluster 1215 may include a replication component (e.g., component 1216) that receives the stream and replicates it to a number of edge servers (e.g., edge servers 1214). In some embodiments, the video cluster 1212 creates multiple low latency renditions from a single source stream and replicates that to thousands of edge servers in the video cluster 1212.

In some embodiments, mobile device clients (e.g., mobile devices 1217A-1217Z) may be capable of selecting an edge server from which they will receive a video stream. In one implementation, a client selects an appropriate edge server responsive to a network test operation. For instance, the client selects a stream, and performs a network test in which the client downloads a video file multiple times. Download statistics regarding the stream such as dropped frames, slow loading, rebuffering, dropped connections and/or other parameters may be used to qualify the performance of a client/edge server connection. If it is determined that the statistics drop below one or more quality measures, the client may connect to an alternative edge server, where the network test is repeated. Multiple edge server connections may be evaluated until an quality connection is identified. During the broadcast of a particular game instance, the clients may be configured to monitor stream quality and may seamlessly switch stream sources (e.g., edge servers) responsive to varying conditions. In some embodiments, edge servers may be capable of providing various stream formats and quality levels, depending on the client and connection capabilities.

Figure 13:
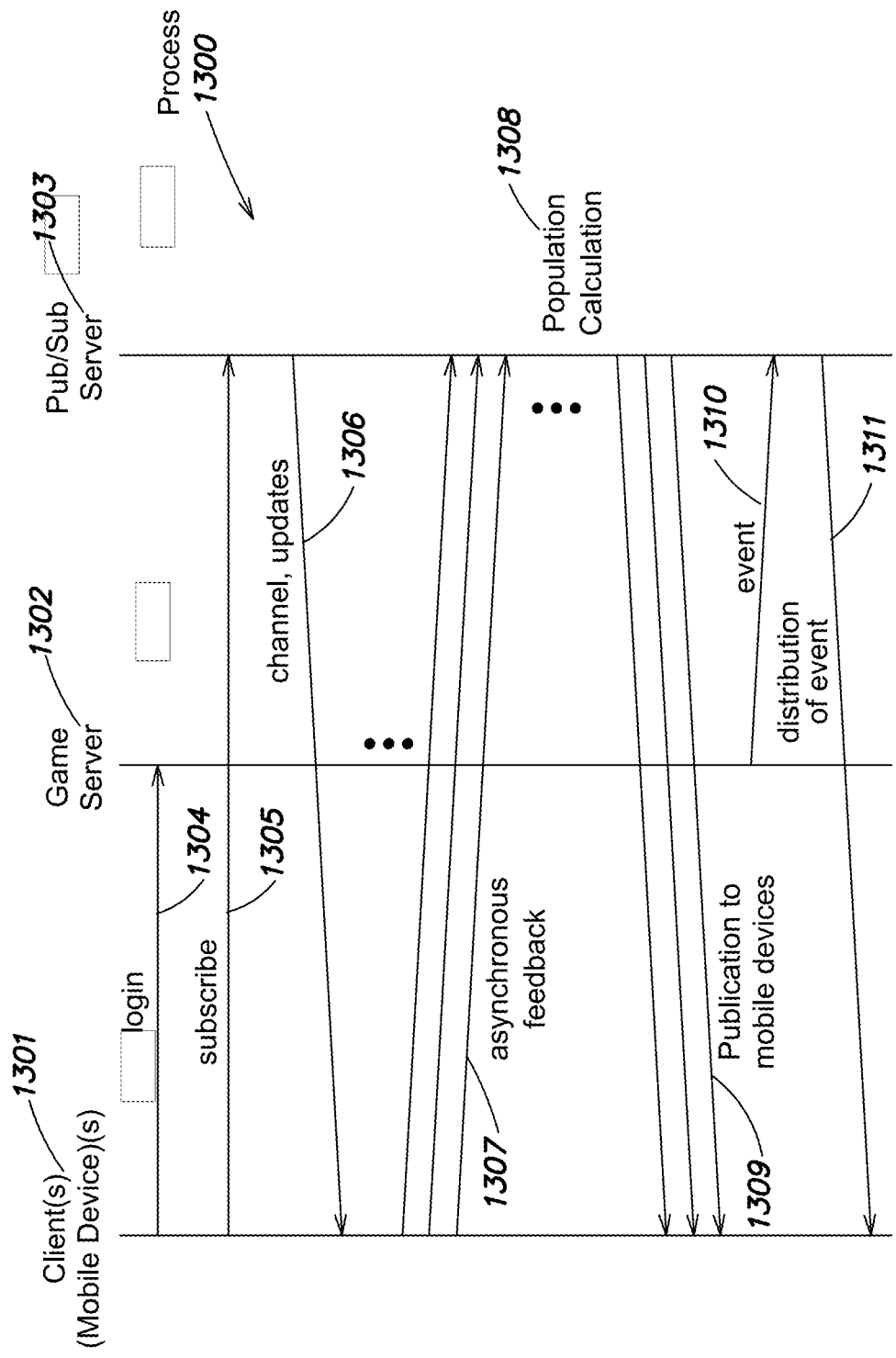
FIG. 13 shows an example sequence of events and communications within the distributed system.

FIG. 13 shows an example sequence of events and communications within the distributed system. In particular, one or more clients (e.g., client(s) 1301) may login 1304) to a game server 1302 in order to participate within an interactive game session. As discussed above, one or more clients may subscribe (1305) to a pub/sub server 1303 to receive certain data associated with a particular channel or channels. For instance, an application may listen for events received asynchronously associated with a game instance. Further, a mobile device may subscribe to one or more videos streams associated with an interactive game.

As the game is conducted, there may be one or more channel updates (1306) that may result in asynchronous interactive elements to be displayed on one or more the clients (e.g. 1301). One or more of these clients may provide asynchronous feedback 1307 to the pub/sub server 1303. The pub/sub server (or alternatively, the game server) may perform one or more calculations association with the asynchronous feedback from the multitude of mobile devices. In one example, the system may analyze the asynchronous feedback 1307 provided by the mobile devices and performed a population calculation 1308 that shows the results of the asynchronous feedback provided by users. Such information may be published to each of the mobile devices that are subscribed to the channel (1309). In this manner, asynchronous feedback may be received and redistributed to mobile devices.

In another example, the game server 1302 may be capable of triggering an event 1310 which causes a distribution of the event 1311 two the multitude of mobile devices. Such events may include asynchronous messages to be displayed within an interface, results of counters, when status, or other information to be displayed.

Figure 14A:
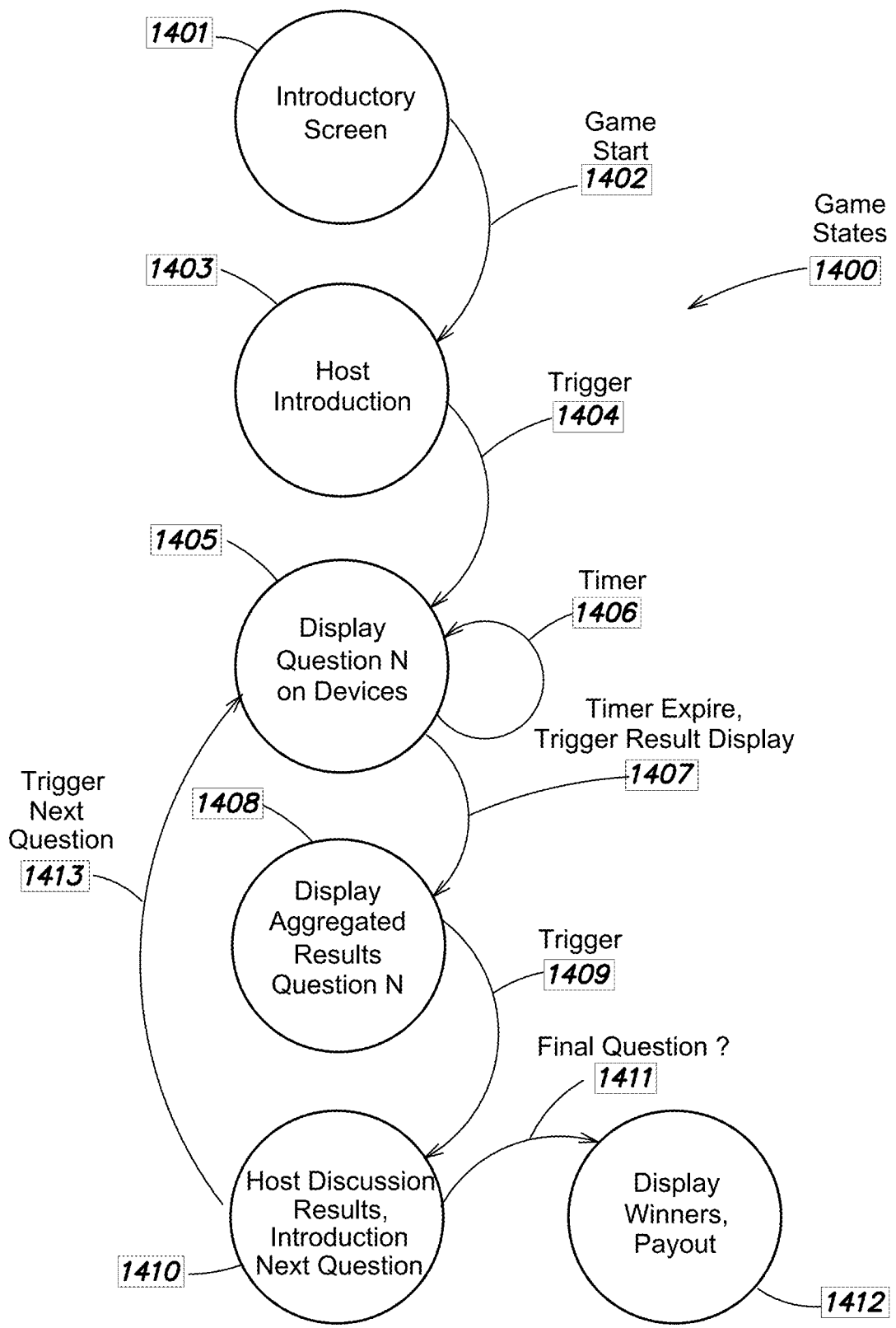
FIGS. 14A-14B show example state diagrams of various game formats according to some embodiments.

FIG. 14A shows an example state diagram of a game format according to some embodiments. In particular, FIG. 14A shows a series of games states 1400 in which an interactive game may operate according to various aspects. At state 1401, an introductory screen is displayed, such as that shown by way of example in FIG. 10. Responsive to a game start event 1402, a close introduction state 1403 may occur which causes another display type to be triggered on the mobile devices. For example, the display shown in FIG. 6 May illustrate a host and provide an introduction to the interactive game.

Thereafter, the game may be initiated via an event (e.g., trigger 1404) which causes the multilevel game to begin. In one such format, there are multiple levels (e.g., 2, 3, . . . 10, 11, 12 or more) where interactive display elements are triggered to be displayed on the multitude of mobile devices. For example, at state 1405 an event is sent to mobile devices that causes a display of a question (e.g., question number N) on the multiple mobile devices. A timer (e.g., timer 1406) may be instantiated by the game server or other entity that determines when valid responses may be received from any of the mobile devices. Upon expiration of the timer the system transitions to game state 1408 where the result displays triggered for the identified question. In particular, the mobile devices may be triggered to display aggregated results for question N. After some period of time, either predetermined or controlled otherwise by the production director, a change of interface may be triggered (e.g., by trigger 1409) back to a host discussion of the results in an introduction to a next question within the multilevel game. After the host discussion, a trigger (e.g., 1413) may be sent to display the next question on the multitude of devices (e.g., at state 1405).

While at state 1410, if the question discussed was the final question, a trigger may be sent to display one or more of the winners and possibly any potential payout at state 1412. Thereafter, the game ends. It should be appreciated that the game may have any number of levels and may involve any number of game tasks and/or game task types. For instance, other games such as board games, puzzles or other game types may be used in any number of rounds to eliminate subsets of players. Also, it should be appreciated that such game instances may be conducted at predetermined times to encourage maximum participation users.

Figure 14B:
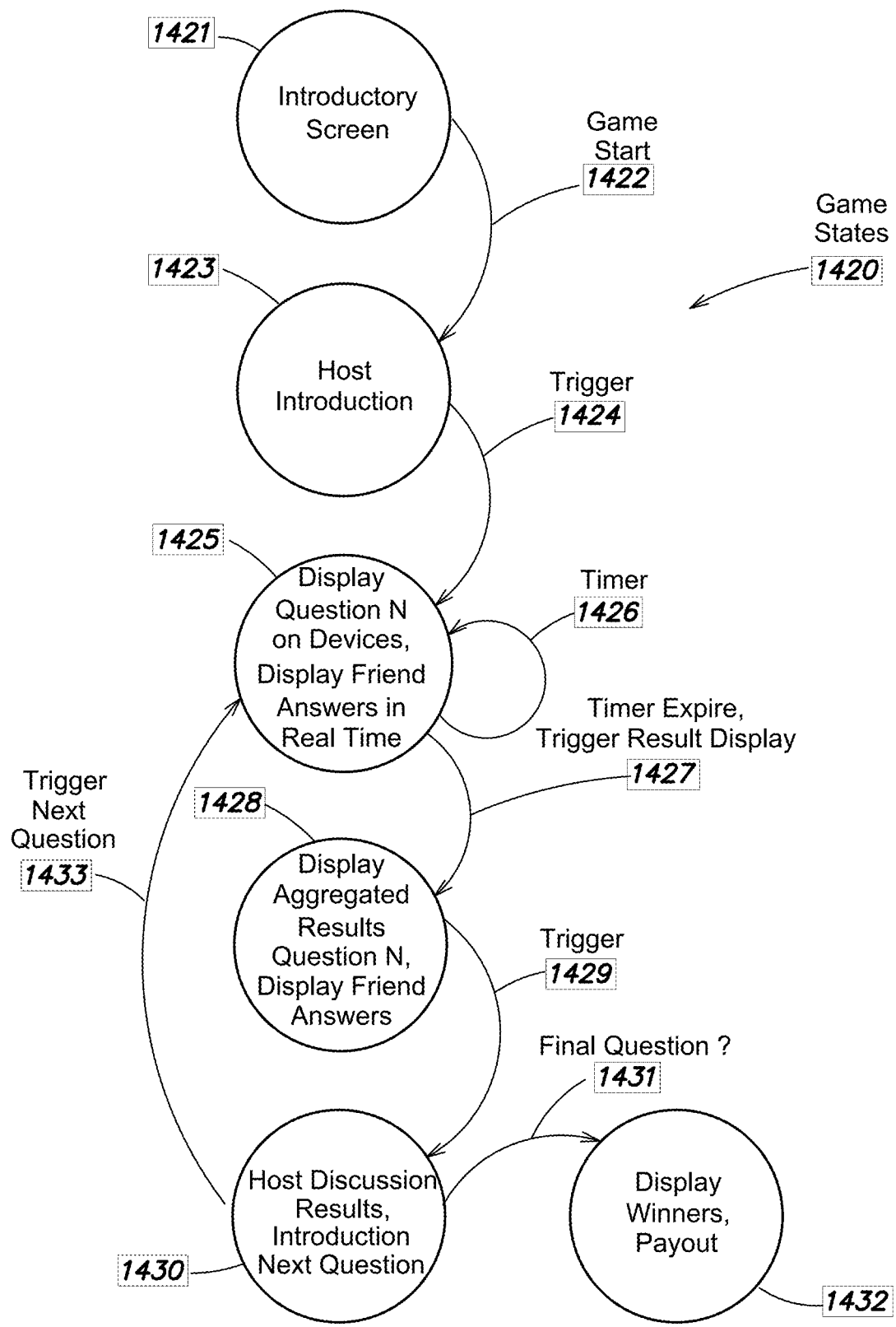

FIG. 14B shows an alternative example state diagram of a game format according to some embodiments. In particular, FIG. 14B shows a similar series of games states 1420 that are similar in nature to states 1400 as shown by way of example in FIG. 14B. Notably, the system is capable of displaying friend answers in real time within the interactive content (e.g., within interactive game elements as shown above with respect to FIGS. 11B-11C). That is, as the answers are received in real-time from a group of permitted users, those answers are shown within the interface to the particular user (e.g., at state 1425). In this way, the user is permitted to view real-time answers from their permitted friends list prior to having to select an answer for themselves. That is, prior to the expiration of the timer, the user is permitted to see what their friends selected which may influence the answer that they provide. Such a capability allows collaboration among users within the approved friends list. When the predetermined timer expires, the aggregated results along with the friends answers may be displayed to the user within the interface (e.g., at block 1428). As discussed above with respect to FIG. 14A, similar elements of FIG. 14B may operate similarly or exactly the same.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An interface of a mobile device, comprising:
a first display area adapted to display real-time video associated with a single instance of an interactive program, wherein:
the mobile device is subscribed to a channel from a publish and subscribe server,
receives, from the publish and subscribe server, the real-time video associated with the single instance of the interactive program;
receives, for one or more edge servers, communicating with the publish and subscribe server, one or more statistics relating to one or more downloads of the real-time video; and
selects at least one of the edge servers from which to receive the real-time video based on the statistics;
a second display area adapted to display an interactive element associated with the single instance of the interactive program, wherein:
the interactive element, when selected within a predetermined time limit, causes the mobile device to transmit a response of a user to an engine executing the single instance of the interactive program, and
based on a first update to the channel, the mobile device receives, from the publish and subscribe server, the interactive element associated with the single instance of the interactive program, wherein the interactive element is received at the mobile device separate from the real-time video associated with the single instance of the interactive program; and
a third display area including at least one indicator that displays, in real time, responses of one or more other users participating in the single instance of the interactive program, wherein:
the one or more other users have permitted the display of their responses to the user within the interface,
based on a second update to the channel, the mobile device receives, from the publish and subscribe server, the responses of the one or more other users,
the responses of the one or more other users are received at the mobile device separate from the interactive element and the real-time video associated with the single instance of the interactive program, and
the responses of the one or more other users are displayed to the user in real time and prior to an expiration of the predetermined time limit for selecting the interactive element to transmit the response of the user.

2. The interface according to claim 1, the interface further comprising a fourth display area including at least one indicator that displays, in real time and subsequent to the expiration of the predetermined time limit, aggregated responses of multiple users participating in the single instance of the interactive program, the aggregated responses including the transmitted response.

3. The interface according to claim 1, wherein the first and second display areas are displayed concurrently within a single interface.

4. The interface according to claim 1, wherein the second display area is adapted to display a plurality of interactive elements in multiple rounds of the interactive program, the plurality of rounds being associated with the single instance of the interactive program.

5. The interface according to claim 1, further comprising a fourth display area including an indicator that identifies a counter of multiple users participating in the single instance of the interactive program.

6. The interface according to claim 1, wherein the third display area including the at least one indicator that displays, in real time, the responses of the one or more other users participating in the single instance of the interactive program, displays icons within an interactive program element.

7. The interface according to claim 1, further comprising a fourth display area including at least one indicator that displays, in real time, a graphical representation of the aggregated responses of the multiple users participating in the single instance of the interactive program.

8. The interface according to claim 1, wherein the real-time video associated with the single instance of the interactive program includes live video captured and streamed in real time.

9. The interface according to claim 8, wherein the live video includes a presentation of a live program including a program host.

10. The interface according to claim 1, wherein the second display area is adapted to display a counter that indicates, to the user, a remaining time permitted for the user to activate the interactive element associated with the single instance of the interactive program.

11. The interface according to claim 10, wherein the third display area including the at least one indicator that displays, in real time, responses of the one or more other users participating in the single instance of the interactive program, displays icons of other users within an interactive program element that selected the interactive program element prior to an expiration of the remaining time.

12. The interface according to claim 7, wherein:
the aggregated responses are transmitted to the publish and subscribe server for analysis,
based on a third update to the channel, the mobile device receives, from the publish and subscribe server, results from the analysis of the aggregated responses, and
the graphical representation of the aggregated responses is generated based on the results.

13. The interface according to claim 12, wherein the results are received at the mobile device separate from the interactive element and the real-time video associated with the single instance of the interactive program.

14. The interface according to claim 1, wherein the interactive element is received at the mobile device in parallel with the real-time video associated with the single instance of the interactive program.

15. The interface according to claim 1, wherein the responses of the one or more other users are received at the mobile device in parallel with the real-time video associated with the single instance of the interactive program.

16. The interface according to claim 1, wherein the mobile device selects the publish and subscribe server from a plurality of servers based on one or more download statistics.

17. The interface according to claim 1, wherein a game engine controls distribution of the real-time video and the interactive element to the mobile device.

18. The interface according to claim 1, wherein the statistics relating to the one or more downloads of the real-time video comprise one or more parameters relating to a performance of a connection with at least one of the edge servers.

* * * * *